US008135646B2

(12) United States Patent
Matsufune

(10) Patent No.: US 8,135,646 B2
(45) Date of Patent: Mar. 13, 2012

(54) CONTENT TRANSMISSION APPARATUS

(75) Inventor: Isao Matsufune, Kanagawa (JP)

(73) Assignee: Sony Corporation, Tokyo (JP)

( * ) Notice: Subject to any disclaimer, the term of this patent is extended or adjusted under 35 U.S.C. 154(b) by 1896 days.

(21) Appl. No.: 10/466,043

(22) PCT Filed: Nov. 7, 2002

(86) PCT No.: PCT/JP02/11613
§ 371 (c)(1),
(2), (4) Date: Jul. 11, 2003

(87) PCT Pub. No.: WO03/042842
PCT Pub. Date: May 22, 2003

(65) Prior Publication Data
US 2004/0179102 A1    Sep. 16, 2004

(30) Foreign Application Priority Data
Nov. 15, 2001    (JP) .................................. 2001-349938

(51) Int. Cl.
*G06F 21/00* (2006.01)
(52) U.S. Cl. ................ 705/59; 705/57; 705/53; 705/52; 705/51; 705/50; 705/901; 705/902; 705/904; 705/911; 380/201; 380/202; 380/203; 380/204; 380/227; 380/228; 380/229; 380/230
(58) Field of Classification Search ...................... 705/59
See application file for complete search history.

(56) References Cited

U.S. PATENT DOCUMENTS

| | | | | |
|---|---|---|---|---|
| 5,629,980 A | * | 5/1997 | Stefik et al. ..................... | 705/54 |
| 6,636,259 B1 | * | 10/2003 | Anderson et al. .......... | 348/211.3 |
| 6,930,709 B1 | | 8/2005 | Creamer et al. | |
| 7,194,512 B1 | * | 3/2007 | Creemer et al. .............. | 709/205 |
| 2001/0015759 A1 | | 8/2001 | Squibbs | |

(Continued)

FOREIGN PATENT DOCUMENTS

JP    10-187305    7/1998

(Continued)

OTHER PUBLICATIONS

H. Schulzrinne Real Time Streaming Protocol (RTSP) (Apr. 1998). Retrived online Oct. 25, 2011.*

(Continued)

*Primary Examiner* — James A Reagan
(74) *Attorney, Agent, or Firm* — Frommer Lawrence & Haug LLP; William S. Frommer; Ellen Marcie Emas

(57) ABSTRACT

A content transmission apparatus is disclosed which promotes distribution of contents over a network and thereby affords better convenience to those who wish to sell and buy the contents. The apparatus is implemented typically as a video camera provided beforehand with an access account from a server apparatus. The content transmission apparatus is equipped with abilities to encode contents in a streaming format for upload and to connect communicably with the server receiving what is uploaded. These features allow the user of the content transmission apparatus easily to upload the content generated thereby to the server without going through complicated steps to sign up with an ISP; to prepare a personal computer, a modem and other hardware; or to make elaborate settings and establish connection with the server. Therefore, uploading of contents is promoted. The server apparatus presents uploaded contents illustratively at its website to solicit potential buyers extensively for the presented contents.

16 Claims, 18 Drawing Sheets

U.S. PATENT DOCUMENTS

2002/0006172 A1 * 1/2002 Molloy .................. 375/340

FOREIGN PATENT DOCUMENTS

| | | |
|---|---|---|
| JP | 11 175477 | 7/1999 |
| JP | 11 224228 | 8/1999 |
| JP | 2000-20441 | 1/2000 |
| JP | 2000 41144 | 2/2000 |
| JP | 2000 101884 | 4/2000 |
| JP | 2000 165809 | 6/2000 |
| JP | 2000-222069 | 8/2000 |
| JP | 2000 250944 | 9/2000 |
| JP | 2001-167024 | 6/2001 |
| JP | 2001 188729 | 7/2001 |
| JP | 2001-204020 | 7/2001 |
| JP | 2001 211171 | 8/2001 |
| JP | 2001-216263 | 8/2001 |
| JP | 2001 217980 | 8/2001 |
| JP | 2001-285756 | 10/2001 |
| JP | 2001-306430 | 11/2001 |
| JP | 2001-306620 | 11/2001 |
| JP | 2001/123686 * | 10/2002 |
| WO | WO 99 48276 | 9/1999 |
| WO | WO 01 50226 | 7/2001 |
| WO | WO 01 67772 | 9/2001 |
| WO | WO 02/39337 | 5/2002 |

OTHER PUBLICATIONS

Patent Abstracts of Japan, vol. 2000, No. 8, Oct. 6, 2000 & JP 2000 134522 A (Digital Camera Network; Pentax Technol Corp), May 12, 2000.

* cited by examiner

F I G. 6
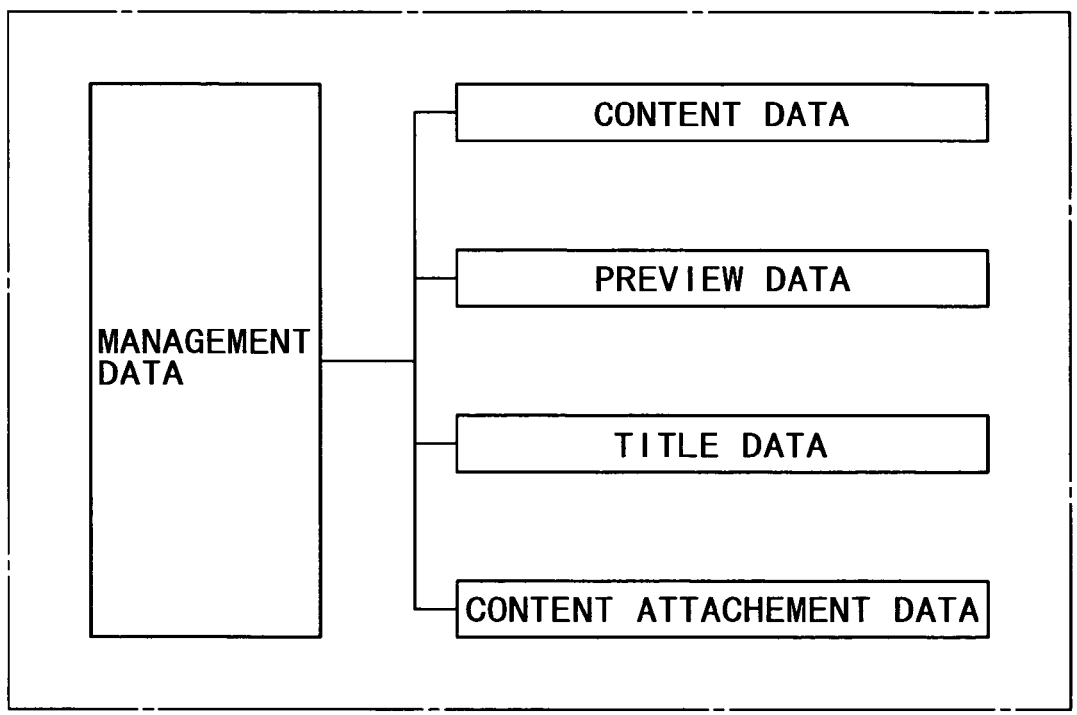

FIG. 15

COMMENT ON PICKUP: * INCIDENT IN HOKKAIDO, * TOWNSHIP, ON SEPTEMBER 25, 2001
AT ABOUT 15:30,

RECORDED DATA:
(GPS) 01:00:00:01-01:00:02:11   LONG. 43° 03'  E, LAT. 141° 21' N
      01:00:02:13-01:00:03:04   LONG. 32° 48'  E, LAT. 130° 42' N
      01:00:03:05-01:00:03:12   LONG. 43° 03'  E, LAT. 141° 21' N (DATE, TIME) 01:00:00:01-01:00:02:11   SEP. 25, 2001, AT 15:24  15:26
             01:00:02:13-01:00:03:04   AUG. 24, 2001, AT 15:59  16:00
             01:00:03:05-01:00:03:12   SEP. 25, 2001, AT 15:28  15:29

(CONTRIBUTOR DATA) NAME: YAMADA TARO
                   NO. OF CONTRIBUTIONS: 3
                   EVALUATION OF CONTRIBUTIONS: GOOD FOR 1, NG FOR 2

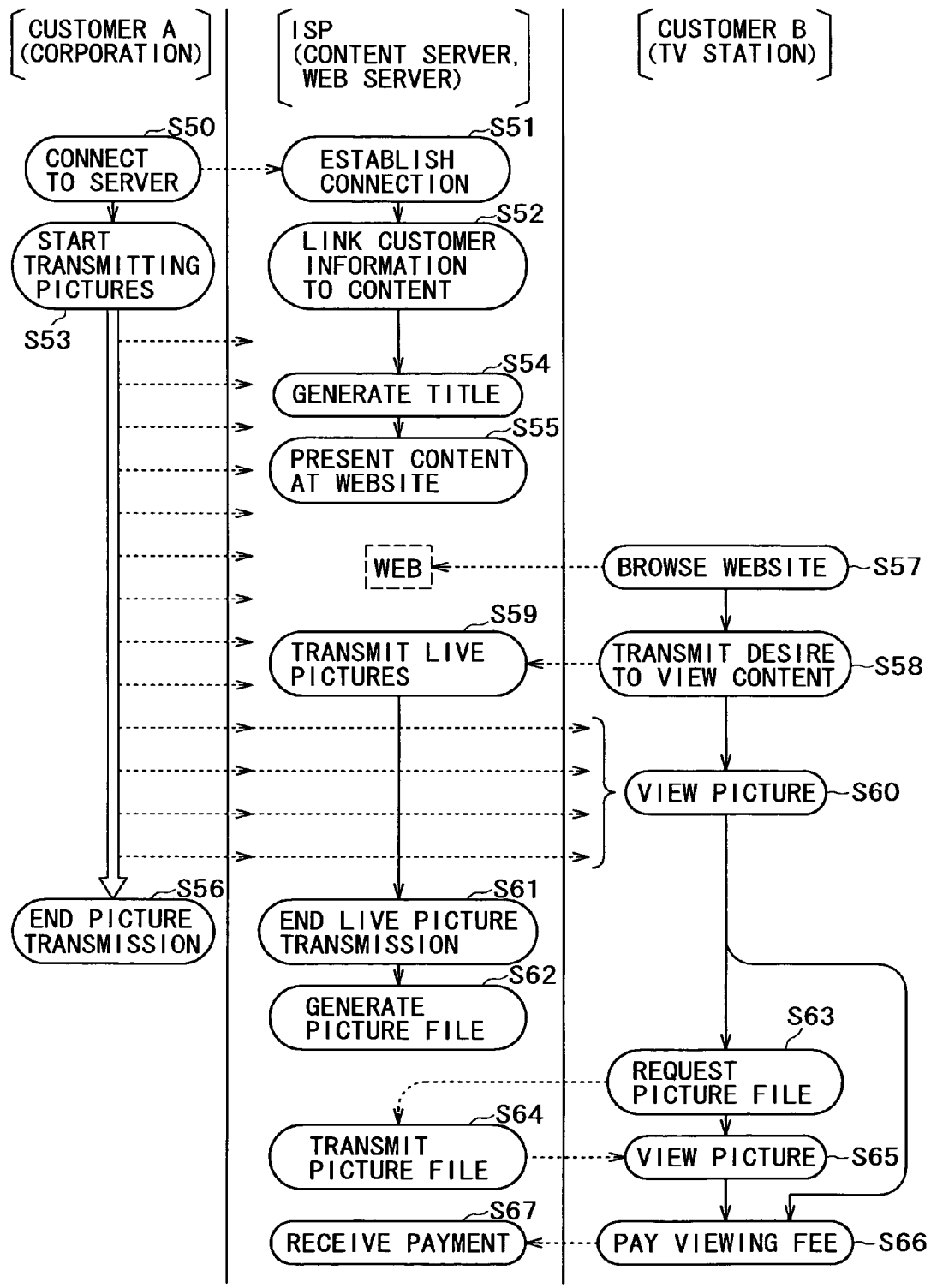

CONTENT TRANSMISSION APPARATUS

TECHNICAL FIELD

The present invention relates to a content transmission apparatus.

BACKGROUND

A growing need is recognized today for the distribution of diverse kinds of contents such as picture data picked up by video cameras or specifically created music data through network communication means like the Internet.

Illustratively, a free-lance video journalist who has picked up scoop pictures of an accident or an event using a video camera at the site may wish to sell the picture content to TV stations or like outlets. In such a case, the journalist may solicit prospective buyers of the content over the Internet and, once the conditions for sale are met, may conveniently transmit the data over the network to those who have agreed to purchase the content.

The TV stations and the like which are always on the lookout for valuable pictures would also find it convenient to solicit promising picture contents over the Internet if a suitable setup were implemented to make the contents available with ease.

The above needs might be met conventionally by establishing an Internet server that handles contents. The server would solicit content uploads from the general public over the Internet and disclose the uploaded contents in order to seek their potential buyers.

With the needs thus met, the server would be expected to promote content distribution in society.

In practice, however, such a conventional server system can hardly be expected to facilitate the distribution of contents. There are a number of reasons:

To make the server system socially useful requires that diverse and numerous contents be uploaded to the server. Potential content buyers such as TV stations will not find the server system attractive unless the system offers contents of high quality in large quantities.

On the other hand, content sellers such as video journalists in possession of potentially valuable contents will find the uploading steps difficult or troublesome to carry out.

The upload procedure generally takes place as follows: where a picture content is to be sent over the Internet, the content output of the video camera is first connected to a video capture board installed in a personal computer (PC). The connection allows the content data to be input to the PC.

The input content data are then encoded in a streaming format. With the PC gaining access to the Internet, the encoded content data are uploaded from the PC to the server.

Where a dedicated Internet line is not available, it is necessary to contract beforehand with an Internet service provider (ISP) to have an Internet connection account established therewith. Obviously the connection service provided by the ISP must be paid for.

Under these circumstances, those who wish to upload their contents are confronted with the following difficulties:

The upload is possible only if they have the necessary means such as a personal computer and communication equipment (e.g., modem) in an environment where the encoding of content data for streaming and the access to the Internet are readily available. These are almost insurmountable hurdles to the person possessing a picture content that must be sold as fast as possible to TV stations or like outlets before the commercial value of the content diminishes over time, such as scoop pictures of an unforeseen accident or incident picked up at the site. When on-site upload cannot be made, the content seller must seek other avenues of marketing the content. In other words, video journalists and other prospective content sellers can scarcely be motivated to upload their pictures to the server.

Where there are few uploads of scoops or other valuable pictures that deserve instant attention, the TV stations and other potential content buyers cannot find the server-based content procurement service attractive.

The upload procedure requires installing an elaborate hardware environment such as the one outlined above. The procedure also involves contracting beforehand with an ISP and paying for the services rendered thereby.

There are other obstacles: connecting the video camera with the personal computer and carrying out the necessary uploading steps can be quite difficult for anyone who wants to send up contents. Such things can be done only by those who have already contracted with the ISP and who are familiar with the ways of PCs and network communications.

For these reasons, video journalists as well as ordinary people who happen to have picked up scoop pictures with their video cameras may wish to sell the content in their possession but are discouraged to do so through conventional uploads to the server. As a result, the number of contents uploaded to such content-offering servers is not expected to become large enough to merit serious consideration.

The server systems, if implemented as outlined above, would remain marginal in their contribution to promoting the distribution of contents in society.

BRIEF DESCRIPTION OF DRAWINGS

FIG. 6 is an explanatory view of a group of data files regarding contents accumulated in the ISP according to the invention;

FIG. 15 is an explanatory view of information offered by the ISP of the first embodiment for determining the credibility of content sellers;

FIG. 18 is an explanatory view of steps performed by a content providing system practiced as a third embodiment of this invention.

BEST MODE FOR CARRYING OUT THE INVENTION

Preferred embodiments of this invention will now be described. The embodiments will include a video camera as a content transmission apparatus and an ISP (Internet service provider) as a server apparatus. The video camera and the ISP constitute the so-called content providing system of this invention.

<A> First Embodiment

1. Configuration of the Content Providing System

A content providing system practiced as the first embodiment of the invention involves connecting a video camera with a software system (for Internet connection service, website administration, etc.), the video camera serving as a content transmission apparatus capable of generating and transmitting picture contents. As such, the system is intended to promote the distribution of picture contents over the Internet while implementing an accounting business by which distributed contents are duly billed and paid for.

Figure 1:
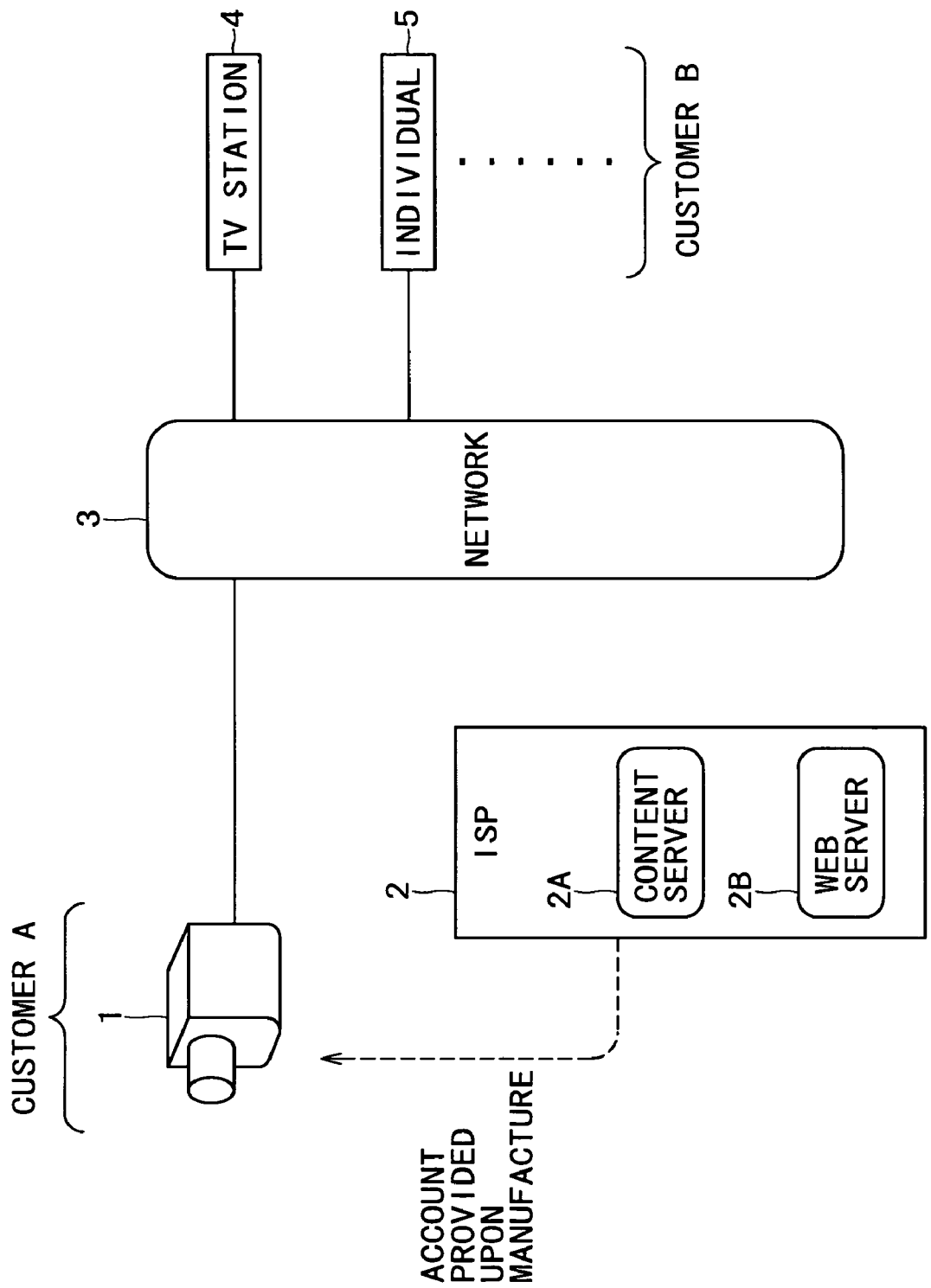
FIG. 1 is an explanatory view showing a typical configuration of a content providing system according to the invention.

FIG. 1 shows a typical configuration of a prototypical content providing system according to the invention.

The system is made of a video camera 1 as a content transmission apparatus having a communicable connection to an ISP 2 over a network 3 formed by the Internet.

The ISP 2 has two functions. That is, the ISP 2 acts as both a content server 2A and a Web server 2B.

The network 3 is constituted by an analog public telephone network, a digital public telephone network such as ISDN (Integrated Service Digital Network), and/or satellite communication links. Although the video camera 1 could be wired to the network 2, it is preferred that the video camera 2 be connected to the network 2 wirelessly.

The video camera 1 is used by a video journalist or any other person intent on selling picked-up picture contents. From the viewpoint of the ISP 2, the content-selling users are generically called the customer A hereunder.

A TV station 4 and an individual 5 illustratively represent organizations, institutions and individuals who wish to purchase picture contents. From the viewpoint of the ISP 2, these content buyers are generically called the customer B hereunder.

The video camera 1 is capable of processing signals for distributing picture contents over the Internet and of connecting to the Internet.

More specifically, the video camera 1 has capabilities to act as a streaming encoder for encoding the obtained picture content in an Internet-ready format such as Real format, Windows Media format, QuickTime format, MPEG2 format, or MPEG4 format; and to serve as a communication unit (e.g., modem and Ethernet interface) connecting to the network 3. The units constituting the streaming encoder and communication unit may be either built in the video camera 1, or furnished as an enclosure independent of the camera body and connectable to the video camera 1 on a wired or wireless basis.

In addition to generating and outputting picture contents, the video camera 1 may also accommodate a recording medium such as a disc or a semiconductor memory. Such storage media, if incorporated, allow the picked-up content to be edited and processed within the video camera 1 before being uploaded to the ISP 2.

Furthermore, the video camera 1 is characterized in that it is furnished beforehand with an access account for connecting to the Internet (i.e., before the camera is handed over to the customer A as the user, such as before shipment from the factory).

The company manufacturing or marketing the video camera 1 either runs an ISP operation of its own or contracts with another company acting as an ISP. The manufacturing or marketing company provides each video camera 1 it manufactures or sells with an access account for connecting to the Internet.

In other words, when the customer A (e.g., video journalist) purchases the video camera 1, the camera is already capable of gaining access to the Internet. There is no need for the customer A to contract anew with the ISP 2 to acquire an access account. Although it is necessary for the user of the video camera 2 to register as the customer A for purpose of management by the ISP 2, that can be done easily by the customer A either returning an attached postcard with his or her address, name and other information written on it, or transmitting the information the first time the customer A logs on to the ISP 2 after the purchase.

Using an already-furnished access account, the customer A may upload picture contents to the ISP 2.

In this case, the ISP 2 may preferably provide the connection free of charge or at a lower rate than usual.

When the video camera 1 is offered together with its previously-provided access account under a preferential rate schedule, the customer A is better motivated to upload picture contents than before. This helps increase the amount of picture contents that may be distributed over the Internet.

The ISP 2, either run or contracted by the manufacturer/distributor of the video camera 1, operates a website (Web server 2B) designed for picture content distribution.

The customer A uploads the acquired picture content to the content server 2A linked to that website.

Uploaded contents are accumulated in the content server 2A and are presented to the general public by the Web server 2B whereby potential content buyers are solicited. The ISP 2 charges those buying any of the presented contents (i.e., customer B) with a fee.

Figure 2:
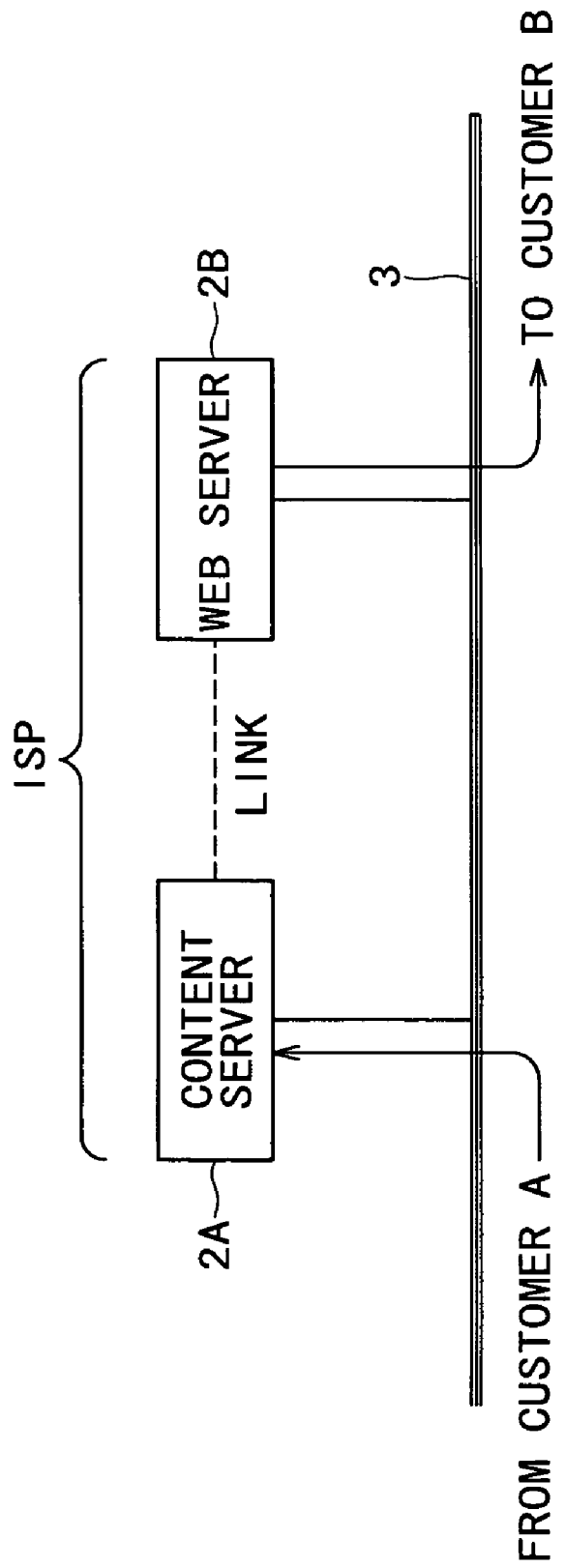
FIG. 2 is an explanatory view of contents flowing through an ISP according to the invention.

As shown in FIG. 2, contents are first uploaded by the customer A to the content server 2A for storage therein. The contents stored in the content server 2A are presented to the public by the Web server 2B. The customer B browsing through the Web server 2B may wish to purchase one of the contents being presented. On request, the content in question is transmitted to the customer B.

In a typical application, video journalists use the video camera 1 and the mass media utilize the contents presented by the ISP 2. More specifically, scoop pictures and other contents picked up by video journalists are collected and presented by the Web server 2B. The TV station 4 and other entities periodically monitoring such presentations may detect a content of interest and purchase it as a picture source.

In another application, a content-auctioning system may be offered to a plurality of prospective buyers.

The TV station 4 pays the video journalist for the price of the picture content and the ISP 2 for a commission. Alternatively, the ISP 2 may contract beforehand with the TV station 4 and others on the website uses covering commissions and other necessary fees. The TV station 4 benefits from the purchased contents if they earn high ratings when broadcast.

The content providing system of this embodiment thus serves to benefit the two sides: the system supports the content-uploading customer financially using readily accessible system arrangements so as to increase the amount of contents being distributed, and the system provides the content-buying customer with desired contents for a commission.

The ISP 2 collects in advance user information about the video camera 1 from the customer A and stores the collected information in a customer registration database. When the customer A accesses the ISP using the video camera 1, the information about the customer A is instantly referenced. The user information about the customer A is composed of the entries made in the returned postcard or transmitted electronically upon purchase of the video camera 1 by the customer for registration with the ISP 2.

Typically, the customer A's user information is personal information such as name, age, contact addresses (telephone number, e-mail address, geographical address, etc.), and other information obtained upon registration.

The user information on each customer is stored in the customer registration database in association with ID information (IP address, etc.), a password, and other necessary information based on the access account attached to the video camera 1 of the customer in question.

As will be discussed later, the customer registration database is useful in presenting information for guiding the customer B toward the suitable contents uploaded, in managing history information, and in helping the system perform steps to improve its reliability.

The Web server 2B may be established to offer diverse kinds of websites depending on the purpose. Illustratively, a video journalist site (VJ site) may be set up to permit the above-described selling and buying of scoop pictures. In this case, the customer A is a video journalist or any other person who happens to have picked up valuable pictures. The customer B is typically the mass media wishing to purchase picture contents from the website and broadcast them as their own sources. This kind of Web server will be discussed in connection with the first and second embodiments of this invention.

In another application, an IR information site may be set up using the Web server 2B. In this case, the customer A may be corporations particularly sensitive to the ups and downs of their own company stock prices, and the customer B may be investors. The website may allow the customer A to provide the customer B with timely information regarding stock prices. This kind of Web server will be discussed in connection with the third embodiment of the invention.

In any case, the customer B is expected to access the site willingly because of an indirect benefit obtained therefrom. This makes it possible for the proprietor of the ISP 2 to run an accounting business charging the customer B for the service rendered.

The customer B may be either the general public or a certain category of people.

In terms of hardware, the customer B need only acquire a communication terminal (e.g., computer terminal) capable of gaining access to the Web server 2B.

If the customer B as the purchaser of contents in this system is invited from among the general public, then the Web server 2B is structured to permit access by anyone wishing to browse through the presented contents for something to buy.

In some cases, the customer B may be restricted to a certain group of people or entities depending on the types and nature of the contents offered by this system (e.g., journalistic contents only). In such cases, the customer B may preferably be limited to specific organizations such as those of the mass media. It may also be desired to restrict the category of the customer B out of consideration for improving the reliability of the system, e.g., in order to prevent illegal access aimed at content falsification or other hacking activities.

A scheme for restricting the customer category may be implemented by asking all customers B to register with the system and granting them passwords or other suitable identifying means for establishing their right to access.

2. Structure of the Video Camera

Figure 3:
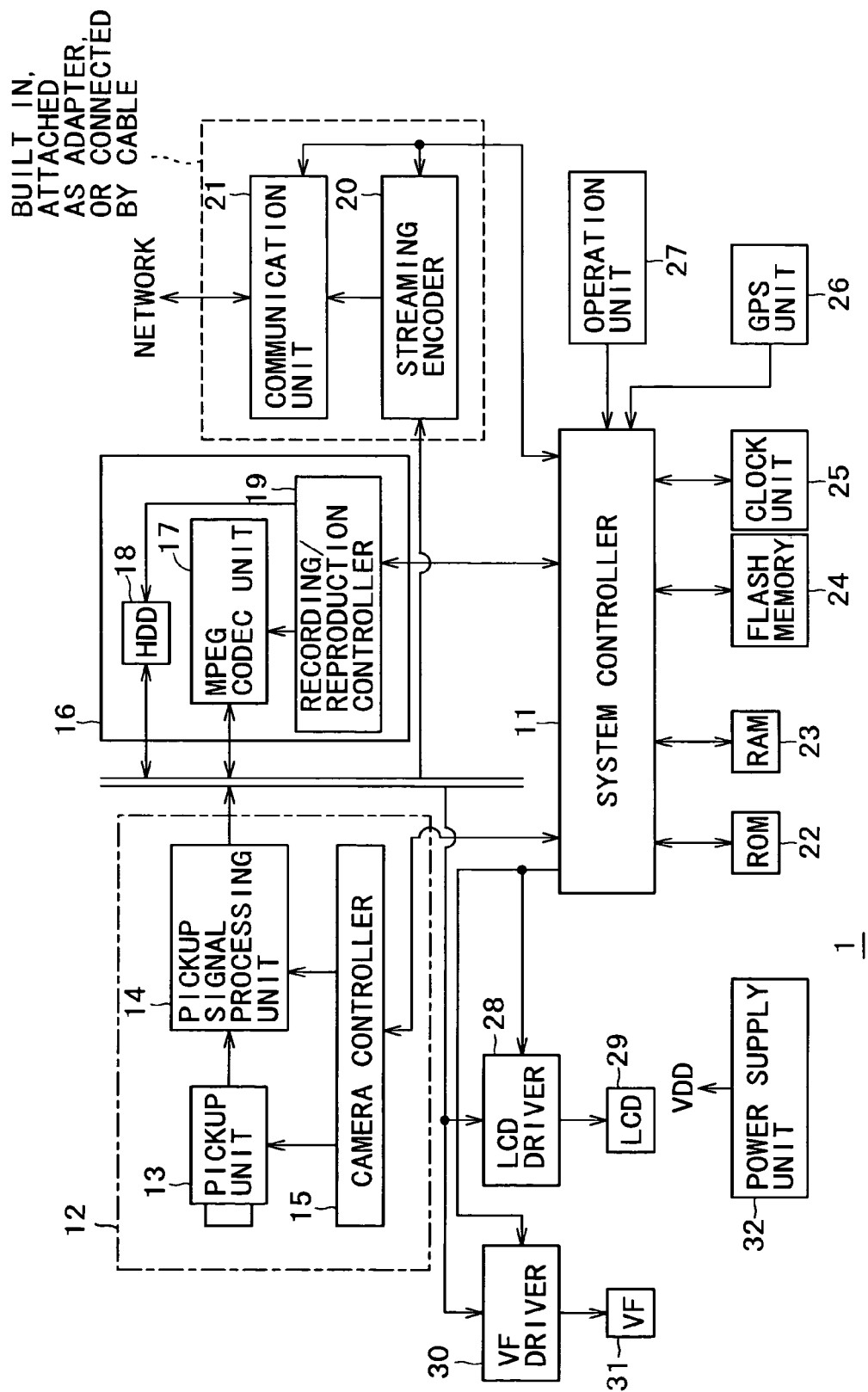
FIG. 3 is a block diagram of a video camera according to the invention.

FIG. 3 shows a typical structure of the video camera 1 serving as the content transmission apparatus of this embodiment.

In FIG. 3, a system controller 11 is made of a microcomputer that controls the video camera 1 in its entirety. The components under control of the system controller 11 are outlined below together with a description of their operations controlled thereby.

A camera unit 12 is designed to take pictures. It includes a pickup unit 13, a pickup signal processing unit 14 and a camera controller 15.

The pickup unit 13 includes three major blocks: a lens block including a pickup lens and a lens stop; a driving block for driving the lens block in automatic focusing and zooming operations; and a CCD (charge coupled device) that detects the light picked up by the lens block and subjects the acquired light to photoelectric conversion to generate a pickup signal.

The pickup signal processing unit 14 includes a sample-and-hold/AGC (automatic gain control) circuit that subjects the signal from the CCD in the camera unit 12 to gain control and waveform shaping, and a video A/D converter. These components combine to generate digital picture data by way of the pickup operation.

The camera controller 15 under the orders of the system controller 11 controls the pickup unit 13 and pickup signal processing unit 14 in their operations. Illustratively, the camera controller 15 controls (the motors of) the pickup unit 13 in automatic focusing, automatic exposure, lens stop-down, and zooming operations.

The camera controller 15 further includes a timing generator that generates timing signals by which to control in signal processing the CCD as well as the sample-and-hold/AGC circuit and video A/D converter inside the pickup signal processing unit 14.

The camera unit 12 generates pickup picture data using the above-described components. Although not shown, a microphone and an audio signal processing block are also included in the camera unit 12 whereby audio data may be generated in synchronism with the pickup picture data.

A recording/reproduction unit 16 is designed to record the pickup picture data obtained by the camera unit 12 to a storage medium as picture contents and to reproduce the stored data from the medium.

The recording/reproduction unit 16 includes an MPEG codec unit 17, a hard disc drive (HDD) 18, and a recording/reproduction controller 19.

Although the HDD is shown here as the typical storage medium, this is not limitative of the invention. Alternatively, the storage medium may be any one of diverse kinds of memories: an optical disc, a magneto-optical disc or a magnetic tape; or a memory card or other solid-state memory.

The MPEG codec unit 17 compresses the pickup image data acquired by the camera unit 12 using an MPEG (Moving Picture Experts Group) method (e.g., MPEG2), and also compresses picked-up audio data using an MPEG audio method.

The compressing steps help to generate MPEG picture contents in various packet formats, to be described later.

Although data compression is shown to be performed illustratively using MPEG methods, this is not limitative of the invention. Other suitable compression methods may be adopted instead.

It is also possible to write picture contents yet to be compression-encoded to the HDD 18 or to upload the uncompressed contents to the ISP.

The HDD 18 records MPEG picture contents generated by the MPEG codec unit 17 and other related information to hard discs.

The recording/reproduction controller 19 under the orders of the system controller 11 controls the MPEG codec unit 17 and HDD 18 in write, read, and data I/O operations.

The MPEG codec unit 17 is ordered to generate the above-mentioned MPEG picture contents and to offer various kinds of information to be inserted as meta data into picture contents.

The HDD 18 is ordered to write and read picture contents and other data to and from the hard discs.

Furthermore, the recording/reproduction controller 19 allows picture contents to be edited under the orders of the system controller 11.

Pickup picture data obtained by the camera unit 12 and picture contents recorded on the HDD 18 may be displayed on a view finder (VF) 31 and a liquid-crystal display (LCD) 29.

In pickup mode or in standby mode, the camera unit 12 may output pickup picture data to one or both of a view finder (VF) driver 30 and an LCD driver 28.

Given orders from the system controller 11, the view finder driver 30 and LCD driver 28 cause the view finder 31 and LCD 29 to display the pickup picture data respectively. The drivers may also cause character images to appear in superposed relation to the display as instructed by the system controller 11.

A picture content reproduced from the HDD 18 is decompressed by the MPEG codec unit 17 into picture data. The decompressed picture data are fed to one or both of the view finder driver 30 and LCD driver 28. In keeping with the orders from the system controller 11, the view finder driver 30 and LCD driver 28 display the supplied picture data on the view finder 31 and LCD 29 together with any character images that may be ordered in superposed relation to the display.

Looking at the view finder 31 and/or the LCD 29, the user is then able to monitor pictures in standby or pickup mode for verification, to check what has been picked up, and to edit the acquired pictures as needed.

A streaming encoder 20 and a communication unit 21 are provided to upload-contents from the video camera 1 to the ISP 2.

The streaming encoder 20 encodes picture contents in an Internet-ready streaming format, such as Real format, Windows Media format, Quick Time format, MPEG2 format, or MPEG4 format.

The communication unit 21 is formed illustratively by a modem, an Ethernet interface, and a mobile telephone interface for communication over the Internet.

A target content stored on the HDD 18 is uploaded as follows: the content of interest is first retrieved from the HDD 18 and encoded by the streaming encoder 20. The encoded content is then uploaded through the communication unit 21 to the ISP 2.

Although the streaming encoder 20 is shown as a single processing block in FIG. 3, this does not necessarily mean that the encoder is implemented as a hardware device. Alternatively, the system controller 11 may encode contents for streaming purposes by carrying out software-based encoding steps.

In FIG. 3, the streaming encoder 20 and communication unit 21 are shown enclosed by broken lines. These components may be either built in the video camera 1 or attached externally to the video camera 1.

Illustratively, the streaming encoder 20 and communication unit 21 are formed into an adapter unit that may be attached to the video camera 1 to permit uploading of contents. As another alternative, a unit including the streaming encoder 20 and communication unit 21 may be either wired or connected wirelessly (in a LAN setup) to the video camera 1.

As another obvious alternative, the streaming encoder 20 and the communication unit 21 may each be connected as an independent unit to the video camera 1.

A ROM 22, a RAM 23 and a flash memory 24 are used by the system controller 11 as a storage area in which to hold necessary data and programs or as a work area in which to perform operations.

For example, the ROM 22 stores processing programs and fixed data for use by the system controller 11. The RAM 23 is used as an area for temporarily accommodating data or as a work area. The flash memory 24 retains various control parameters.

As mentioned above, the video camera 1 of this embodiment is provided beforehand with an access account from the ISP 2. ID information constituting the access account is stored in the flash memory 24. Illustratively, this ID information is written to the memory before the video camera 1 is shipped from the factory (or before being marketed).

The access account includes a password furnished in association with the ID. In some cases, the password may be placed either in advance or by the user's operation into the flash memory 24.

A URL (Uniform Resource Locator) of the ISP 2 may also be written beforehand to the flash memory 24.

A clock unit 25 generates the current time of day (in terms of the year, month, day, hours, minutes, and seconds). In pickup mode, the current time information generated by the clock unit 25 is supplied from the system controller 11 to the recording/reproduction controller 19 whereby the information is inserted illustratively into data packets making up an MPEG picture content. In other words, the current time information is given as information about the date and time at which a given picture content was generated.

A GPS (Global Positioning System) unit 26 includes a GPS antenna and a GPS decoder by which to obtain GPS-based current position information. The GPS antenna receives GPS signals, and the GPS decoder decodes the received signals to output latitude and longitude data constituting the current position information. In pickup mode, this position information is supplied from the system controller 11 to the recording/reproduction controller 19 whereby the information is inserted illustratively into data packets making up an MPEG picture content. In other words, the current position information is given as information about the location at which a given picture content was generated.

An operation unit 27 includes various control keys which the user may manipulate to operate the video camera 1. These keys are operated to control power supply, picture pickup, reproduction, zooming, mode switchover, editing, and upload operations.

The system controller 11 detects the User's key operations and ensures that these operations are implemented by the relevant components.

The operation unit 27 allows the user to input text. By utilizing a text input function of the operation unit 27, the user may illustratively enter a comment about the picked-up content. When the comment is input, the system controller 11 transfers the text data to the recording/reproduction controller 19 as data constituting a single comment file. The recording/reproduction controller 19 generates the comment file and writes it to the HDD 18 in association with the applicable content.

Whereas the operation unit 27 permits text input and editing, there may also be provided an interface which is based on USB, IEEE or other suitable standards and through which external equipment (e.g., personal computer) is connected. The user may enter text or edit the input text by operating such external equipment.

A power supply unit 32 illustratively includes a DC/DC converter that supplies the component circuits with required levels of supply voltage by either tapping a DC source from internal batteries or utilizing a DC source derived from a commercial AC power supply via a power supply adapter. The activation and deactivation of the supply voltages from the power supply unit 32 are controlled by the system controller 11 in response to the key operations on the operation unit 27.

3. Structure of the ISP and the Database

Figure 4:
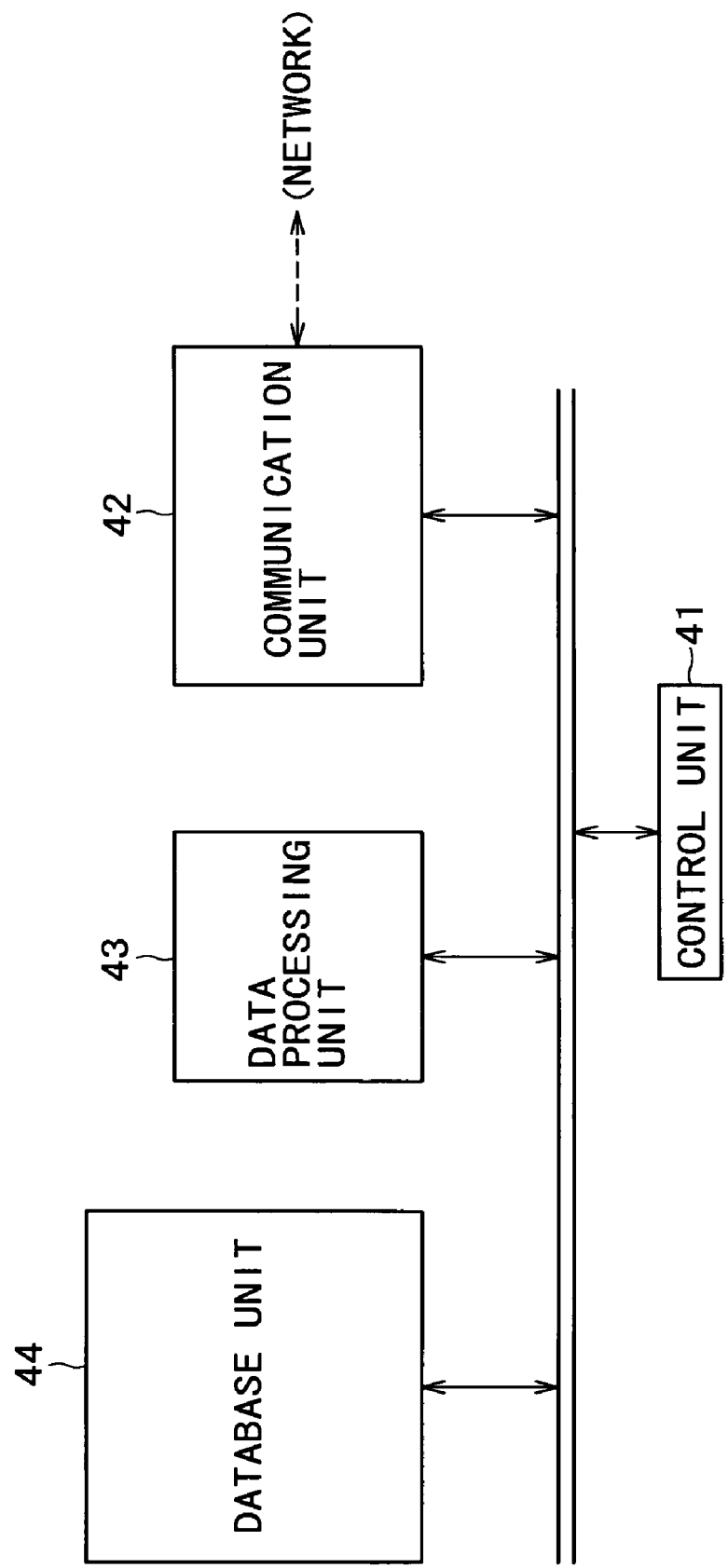
FIG. 4 is a block diagram showing how the ISP is structured according to the invention.

FIG. 4 shows a typical structure of the ISP 2.

The ISP 2 has a control unit 41, a communication unit 42, a data processing unit 43, and a database unit 44.

The communication unit 42 conducts communications over the network 3.

The data processing unit 43 performs various processes on contents uploaded from the video camera 1 connected illustratively through the communication unit 42. As will be discussed later in more detail, the data processing unit 43 extracts added data from contents, generates low-quality short-time preview data using content data, and generates title data.

The database unit 44 accommodates a customer registration database, contents, and diverse kinds of information attached to the contents.

The control unit 41 controls the communication unit 42 in communicating operations, the data processing unit 43 in processing operations, and the database unit 44 in data management, data storage and retrieval operations.

The control unit 41 also carries out processes allowing the ISP 2 to function as the content server 2A and Web server 2B.

The content server 2A and Web server 2B need not be implemented in a single hardware block. These servers need only be linked together over the network 3. In other words, the setup of FIG. 4 may be structured so as to implement at least the function of the content server 2A alone; the Web server 2B may be implemented in another hardware structure.

Figure 5:
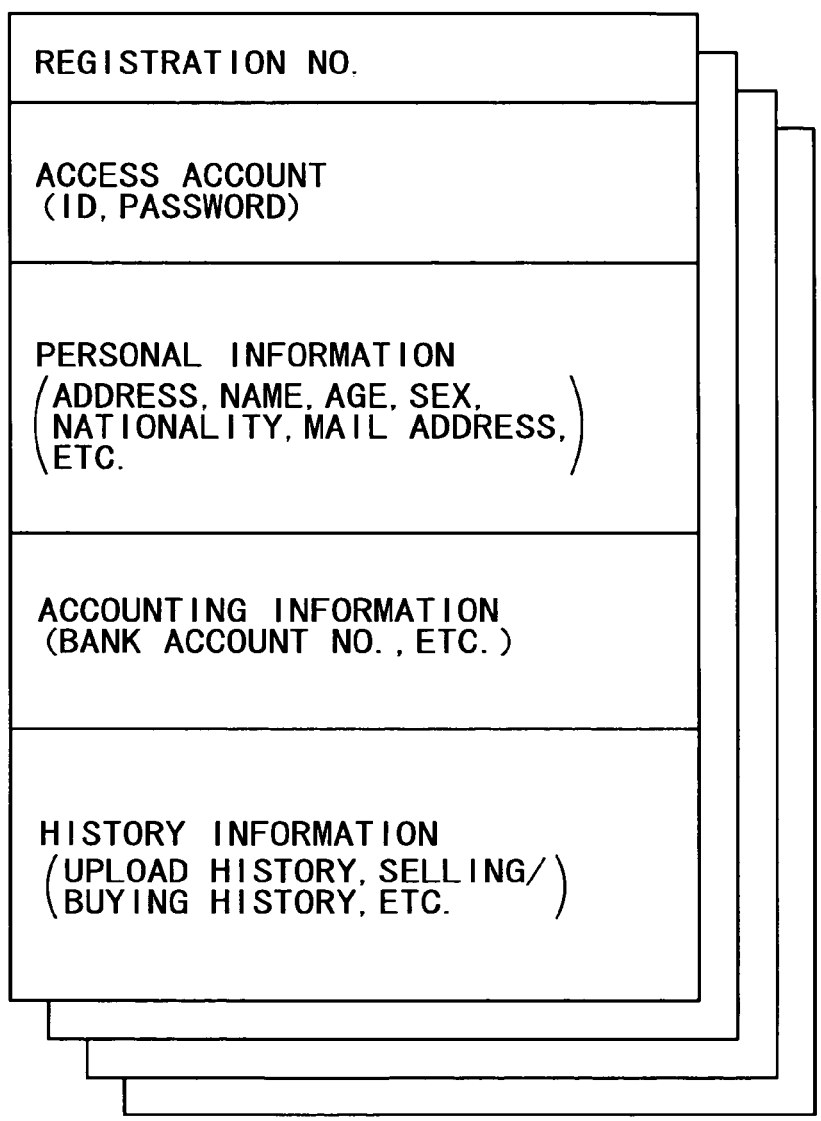
FIG. 5 is an explanatory view of a customer registration database according to the invention.

The customer registration database held in the database unit 44 is structured internally as shown in FIG. 5.

FIG. 5 schematically indicates how a single database file is structured in the customer registration database.

A database file refers to a group of data about one video camera 1 employed by a given user.

Each database file is given a registration number in conjunction with access account data allotted to the video camera 1 in question beforehand. The access account data include an ID and a password assigned to the video camera 1. In addition to the ID, the access account of each video camera 1 may be registered illustratively in association with a manufacture number and a manufacturer code applicable to the video camera in question.

The database file contains personal information on the user (customer A) such as address, name, age, sex, nationality, e-mail address, and telephone number reported by postcard or through an electronic connection to the ISP 2 following the purchase of the video camera 1.

The database file also includes payment information. If any content uploaded by the customer A through this system is purchased by the customer B, the payment information such as a bank account number is used to let the customer B make a corresponding payment to the customer A.

Basically, the personal information outlined above is registered immediately after purchase of the video camera. Later, a history of the customer A may be stored additionally as needed.

Illustratively, an upload history including the number of uploads, dates and times of uploads, and types and sizes of uploaded contents may be accumulated. A selling/buying history may also be accumulated covering the dates and times of content selling/buying deals concluded or not concluded, contents sold and bought, amounts paid, and names of buyers.

Any feedback such as comments from the buyer (customer B) may also be accumulated.

Where the credibility of contents is determined, the determination may be accumulated as the buyers' credibility information derived from evaluation of the contents.

When the customer A uploads a content, the uploaded content is entered into the database unit 44. FIG. 6 schematically shows a typical structure of a data file prepared for the uploaded content.

Following the content transmission from the video camera 1, the data processing unit 43 extracts data that were added as meta data to the content. A comment data file may also be transmitted along with the content.

By extracting the added data and comment file from the content, the data processing unit 43 generates a data file made up of content attachment data corresponding to the content in question.

The content attachment data are linked through management data to the content data before being stored into the database unit 44.

The data processing unit 43 generates low-quality preview data as part of a given content, such as picture data lasting about several to tens of seconds expressing the beginning of the picture content. The preview data are also linked through the management data to the content data before being stored into the database unit 44.

The data processing unit 43 further generates a thumbnail image using part of a picture content such as a picture frame at the beginning of the content or by use of a picture frame designated by designation information (i.e., cue data, to be described later) as added data. The unit 43 also generates text information based on the added data or comment file and presents the generated text as title data. The title data are also linked through the management data to the content data before being stored into the database unit 44.

In other words, each content is entered into the database unit 44 or other suitable storage device in linked relation to the applicable preview data, title data, and content attachment data by way of the management data regarding the content data in question.

The management data allow each content to be managed in linked relation to a single database file in the customer registration database. That is, each content is linked to the customer A who uploaded the content in question.

The management data may be constituted either by header data of the content data or by a file separate from the content data.

The management data are used to manage the links of data files to the content data and the links of the files to the customer registration database. Management information about the content data themselves is also recorded as part of the management data. For example, every time a content is uploaded, the data size of the content is recorded. It is also possible additionally to record a selling/buying history and other relevant history information about each content.

The structure in FIG. 6 is shown only as a schematic example of how a group of files is arranged corresponding to one content. These files may be stored in any suitable manner.

Illustratively, a content database, a preview database, a title database, and a content attachment database may be established separately, each database being tapped for a single file linked to a given content. Obviously, these databases need not to be accommodated altogether in the single database unit 44.

As another alternative, the group of files shown in FIG. 6 may be formed into a single database file to be stored in a database.

As yet another alternative, content data and preview data may be generated and stored by the content server 2A, with title data generated by the Web server 2B in linked relation to the applicable content data.

4. Steps of System Operation

Figure 7:
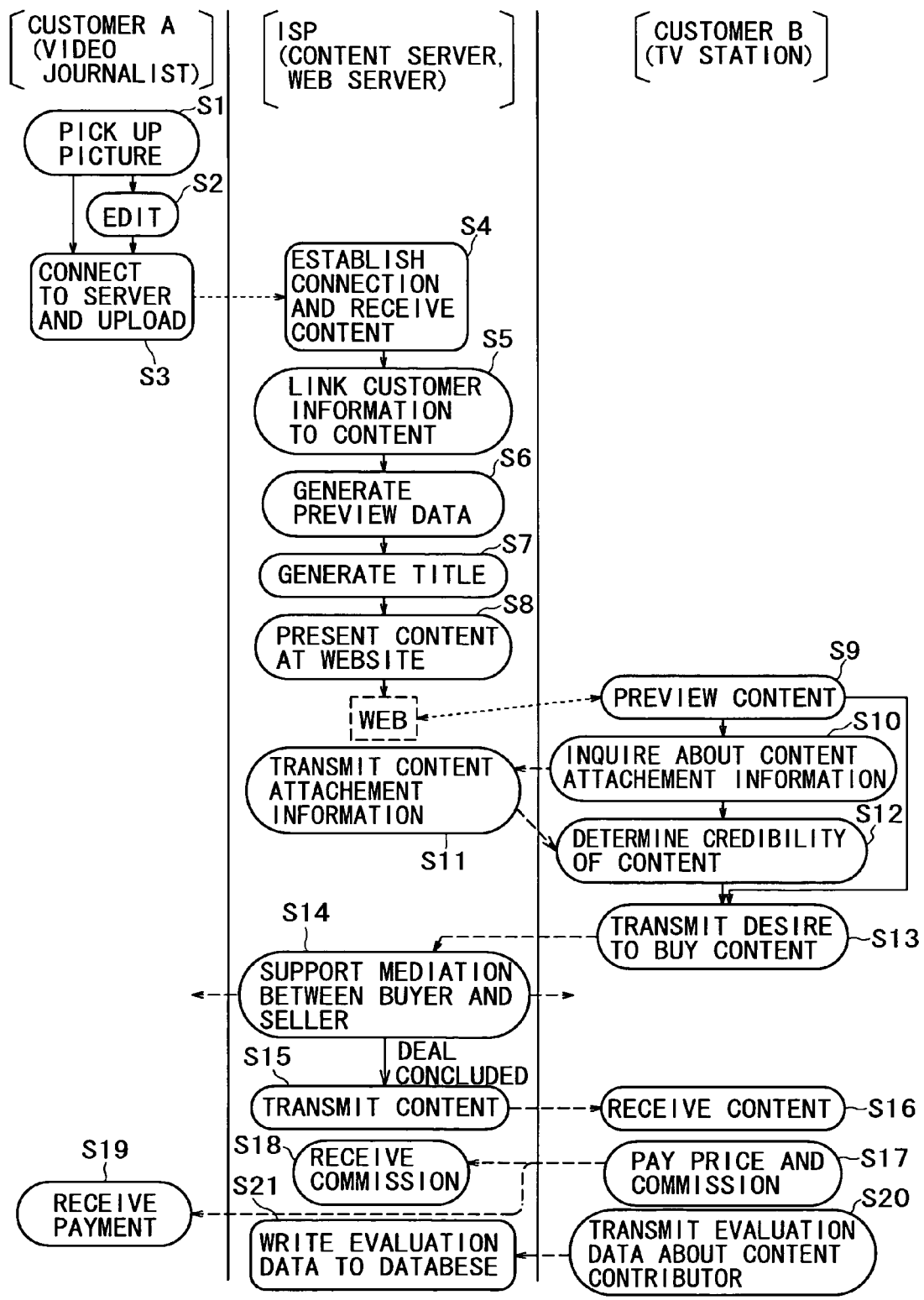
FIG. 7 is an explanatory view of steps performed by a content providing system practiced as a first embodiment of this invention.

Described below with reference to FIG. 7 is how the content providing system of this embodiment works as a whole. The description of the workings of the system is followed by a more detailed description of the steps in which the video camera 1 picks up pictures and uploads the picture content, and the steps in which the ISP 2 receives an uploaded content and presents the uploaded content at its website.

FIG. 7 separately shows the steps performed by the video camera 1 owned by the customer A, the steps carried out by the ISP 2, and the steps conducted by the customer B (e.g., at a computer terminal).

Steps S1, S2 and S3 are the steps performed by the video camera 1 (owned by the customer A) from the time that it starts picking up pictures until the picked-up content is uploaded.

The customer A first picks up pictures using the video camera 1 (in step S1). This step applies illustratively when a video journalist takes pictures of the site of an incident. In this step, the video camera 1 generates a single picture content.

The acquired picture content recorded to the HDD 18 may be edited by the video camera 1 (in step S2). For example, the stored content is subjected to cut editing whereby a picture content of an appropriate length is created.

The customer A uploads the as-acquired or the edited content to the ISP 2 (in step S3). The upload is accomplished by the video camera 1 having the structure of FIG. 3, i.e., without recourse to any other device (e.g., personal computer). Specifically, the customer A first connects to the Internet using the Internet access account assigned to the video camera 1. With the connection established, the customer A uploads the picture content to the ISP 2.

When a connection request is made from the video camera 1, the ISP 2 establishes the connection and receives the uploaded content (in step S4).

As described above, the content server 2A holds the customer information about the customer A in the customer registration database. With the connection established, the ISP 2 automatically identifies the customer A based on the access account found in the request, and links the information about the content contributor (customer A) to the uploaded picture content for storage in the database unit 44 (in step S5).

The uploaded content is later disclosed by the Web server 2B at its website. Prior to the disclosure, the ISP 2 automatically takes steps to facilitate presentation of the content and forestall illegal uses of the disclosed data.

Preview data of the content are first generated (in step S6). The preview data are intended to introduce the outline of the content. As such, the preview data are derived illustratively from part of the content in question. In order to prevent their fraudulent uses, the preview data are deliberately reduced in resolution or in picture size. The preview data thus generated are linked to the uploaded content before being stored into the database unit 44. That is, the ISP 2 retains two kinds of content: the original high-quality picture content, and low-quality preview data content.

The ISP 2 (content server 2A or Web server 2B) generates title data by attaching a content ID and time information to the content (in step S7). The title data may be text data including customer information retrieved from the customer registration database, time and position information extracted from the uploaded content, and comment information. As part of the title data, a still picture (so-called thumbnail image) is also generated by extracting a single frame from the content.

With the title data generated, the Web server 2B presents the content using the title data at the website. That is, the content is presented as available data to the public (i.e., to those authorized to access) (in step S8).

The customer B such as a TV station gains access to the Web server 2B as needed and browses the presented contents (i.e., thumbnail images and introductions as title data of contents). If the customer B's attention is attracted by the title of any content at the website, the customer B clicks on the title so as to preview the picture content (in step S9).

The click causes the ISP 2 to display the linked preview data in a website screen.

The customer B browsing the title data or the preview data may decide to purchase the content in question. In that case, the customer B transmits the desire to buy the content to the ISP 2 (in step S13). Illustratively, the willingness to purchase the content is reported by designating the applicable content ID presented at the website.

Before the purchase, the customer B can verify the credibility of any content disclosed at the website. The verification is made by the customer B inquiring about the content attachment information by which to determine the credibility of the content of interest (in step S10).

In response, the ISP 2 transmits the content attachment information to the customer B (in step S11). The transmitted information includes time and position information about the scenes making up the content, and a comment made by the contributor (customer A) of the content.

The content attachment information may be provided either by the Web server 2B at its website or by means of e-mail.

Given the content attachment information, the customer B determines whether or not the content in question is credible (in step S12). The determination may be made either by software in the customer B's terminal automatically determining the credibility of a given content based on its pickup time and location, or by the customer B himself or herself based on the content attachment information received.

Once the decision is made to purchase the content, the customer B designates the applicable content ID and transmits the desire to purchase that content to the ISP 2 (in step S13).

Simultaneously with (or subsequent to) transmission of the willingness to buy the content, the customer B reports a desired price for that content.

Upon receipt of the customer B's desire to purchase the content, the ISP mediates negotiations between the customer A and the customer B (in step S14). Illustratively, an administrator of the ISP 2 forwards, by e-mail or telephone, the proposed price to the video journalist who uploaded the content in question. The deal concludes when the both parties have agreed about the price. There can be diverse ways in which to support the bargaining between the seller and the buyer. For example, the ISP 2 may arrange for the customer A and customer B to negotiate directly with each other.

When a deal is concluded between the buyer and the seller, the ISP 2 transmits the high-quality picture content from its storage to the customer B (in step S15). The customer B receives the transmitted content for use in, for example, broadcast (in step S16).

The customer B pays the price and a commission for the content purchased. That is, the customer B makes an agreed-upon payment to the customer A (e.g., video journalist) for the content and disburses the commission to the ISP 2. The commission may be a predetermined percentage of the price of the purchased content. The administrator of the ISP 2 receives the commission (in step S18), and the customer A receives the payment for the content sold (in step S19).

The payments are made illustratively through electronic transfers between bank accounts, by direct payment into bank accounts, or by mailed checks.

In the case of a direct payment by the customer B to the customer A, the customer B may acquire from the ISP 2 the customer A's bank account number, address, name and other relevant information (i.e., information stored in the customer registration database) preparatory to the payment.

Payments to the customer A may be mediated by the ISP 2. That is, the customer B may pay the ISP 2 a combined sum of the price for the purchased content and of the commission related with it. Of the disbursed amount, the payment for the content is forwarded to the customer A by the ISP 2, illustratively by electronic transfer to the customer A's bank account registered with the customer registration database.

The customer B may evaluate the purchased content and transmit evaluation data to the ISP 2 (in step S20). The ISP 2 writes the evaluation data to the customer registration database as part of the customer A's history data. As more and more evaluation data are accumulated on each customer A, the ISP 2 can evaluate the degree of each customer A's reliability thereby. The accumulated evaluation data may also be used as a basis for determining the credibility of any new content contributed by each customer A.

The basic workings of the inventive system take place as outlined above. Supplementary steps may also be carried out by the system to handle additional processes.

Illustratively, if a plurality of potential buyers wish to purchase the same content, an auction could be held by the system over the network.

The above-described steps S1 through S3 in which the video camera 1 picks up pictures until it uploads the picture content will now be discussed in more detail with reference to FIGS. 8 through 11.

Figure 8:
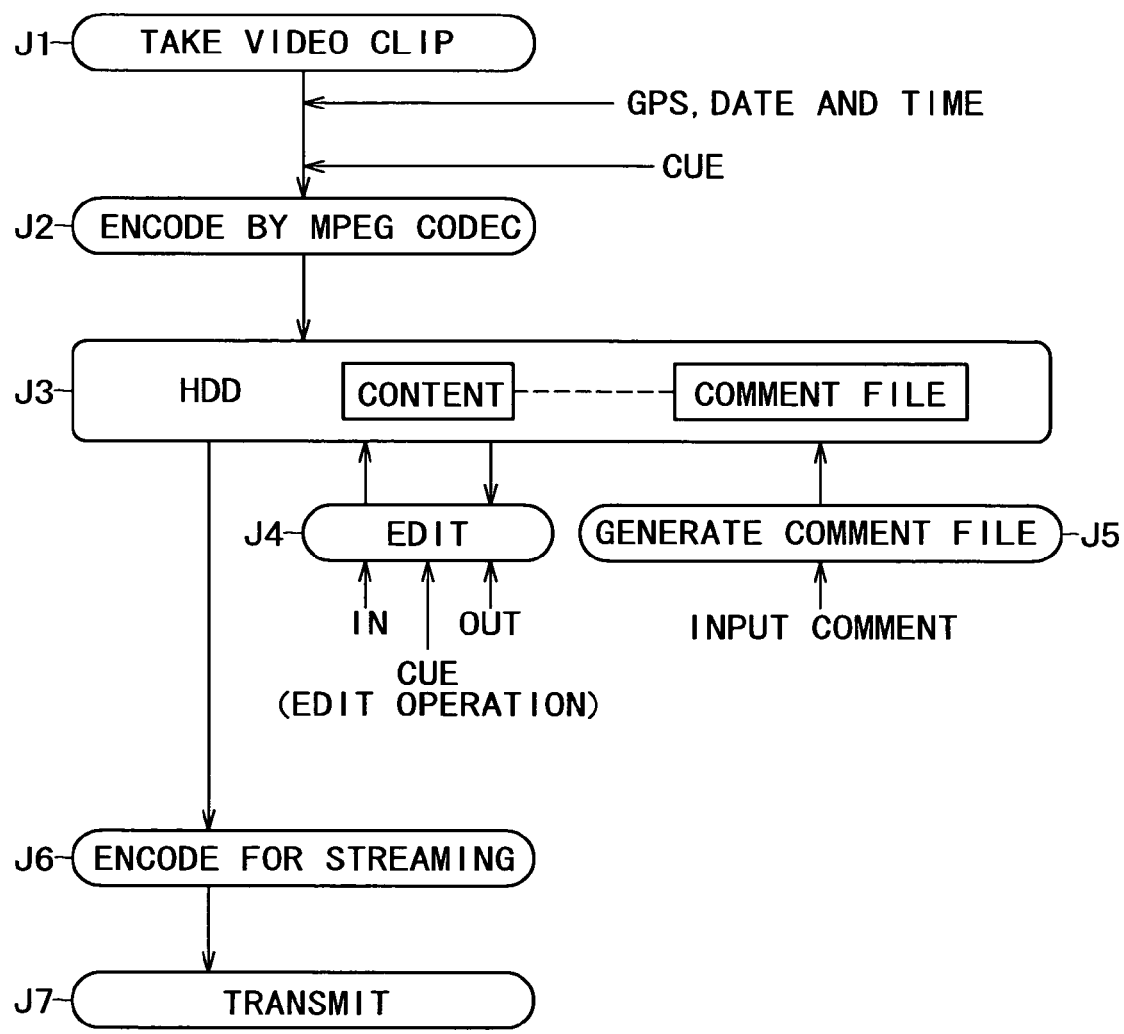
FIG. 8 is an explanatory view of steps performed by a video camera according to the invention.

FIG. 8 shows steps J1 through J7 detailing the pickup step S1, editing step S2, and server connecting/uploading step S3.

In the pickup step J1, the customer A takes a video clip (an integral video-and-audio content) using the video camera 1. In pickup mode, the pickup picture data (and audio data) obtained by the camera unit 12 are encoded by the MPEG codec unit 17 into MPEG picture data (from step J1 to step S2). The encoded data are recorded to the HDD 18 (from step J2 to step J3).

During the pickup, the recording/reproduction controller 19 is supplied with current time information (in year, month, day, hours, minutes and seconds) obtained by the clock unit 25 and with current position information (in longitude and latitude) acquired by the GPS unit 26. The information thus supplied is inserted into an MPEG data stream.

Figure 9:
FIG. 9 is an explanatory view of a content structure according to the invention.

FIG. 9 depicts a typical structure of MPEG data.

As illustrated, MPEG data are headed by a header followed by video packets, audio packets and data packets. In other words, MPEG data are composed of synchronously multiplexed video, audio and data packets.

The picture and audio data picked up by the camera unit 12 are multiplexed synchronously when encoded by the MPEG codec unit 17.

The data packets are capable of accommodating diverse kinds of information as meta data other than the pictures and sounds. The meta data include the following:

Pickup Position Information

The GPS unit 26 built in (or connected to) the video camera 1 automatically records information about the location (in longitude and latitude) where the pickup takes place.

Current Time Information

A clock (clock unit 25) built in the video camera 1 automatically records the current time of day in effect during the pickup. If a radio signal-based clock is utilized, it is possible to record universally accurate time stamps.

Time Code

Control time information and frame information linked to the picked-up video and audio data are automatically recorded.

Cue Point Information

A time code of a scene (one frame) deemed to represent the entire video click is recorded as a cue point. The content contributor may designate a desired position (frame) as a representative scene by suitably manipulating the operation unit 27. Where no frame is designated by the contributor, the first frame of the video clip may be automatically selected as the cue point.

Mark-In/Mark-Out Information

The first frame (called a mark-in point) and the last frame (called a mark-out point) of a really needed portion in the video clip can be recorded. These points are designated where desired (i.e., in terms of frames) by the content contributor manipulating the operation unit 27. If no points are designated by the contributor, the first and the last frames of the video clip may be automatically designated as the mark-in and the mark-out points, respectively.

The cue point information and the mark-in/mark-out information are added during editing after the pickup of pictures. As such, these items of information may alternatively be furnished in a separate file instead of being multiplexed with data packets.

During the pickup, the time information from the clock unit 25 and the position information from the GPS unit 26 are fed to the recording/reproduction controller 19. These items of information are inserted into the MPEG content as data packets.

If in pickup mode the content contributor manipulates the operation unit 27 to designate a cue point, the cue point information is also supplied to the recording/reproduction controller 19. The supplied information is inserted into a data packet by the controller 19.

The picture data encoded in MPEG format are thus supplemented with the time and position information as data packets as described. The resulting data are recorded as a picture content to the HDD 18.

The picture content generated in the pickup step S1 of FIG. 7 (corresponding to steps J1, J2 and J3 in FIG. 8) may be subjected to the editing step S2 inside the video camera 1. Step S2 divides into an editing step J4 and a comment file generating step J5 in FIG. 8.

In the editing step J4, the user's editing operations performed with the operation unit 27 are translated into adding mark-in/mark-out information and cue information to the content. That is, these items of information are added to the data packets described above.

A typical editing process is shown schematically in FIGS. 10A and 10B.

FIG. 10(a) indicates a single content that has been picked up, encoded in MPEG format, and recorded to the HDD 18. Time codes are also included in the figure. It is assumed that this content is a 20-minute content defined by the time codes ranging from "00:00:00:00" (in hours, minutes, seconds, frames) to "00:20:00:00." A scene refers to a segment of content delimited by pauses (temporary stoppage) during the pickup.

This content is made up of five scenes #1 through #5.

The user inputs mark-in/mark-out information while viewing the reproduced content illustratively on the LCD 29. FIG. 10(a) shows that three segments of the content are furnished with mark-in/mark-out information.

Where mark-in points (IN) and mark-out points (OUT) are designated as illustrated, the recording/reproduction controller 19 adds the mark-in/mark-out information to the frames corresponding to the designated points. In practice, the frame numbers representing the mark-in and mark-out points are recorded to the data packets.

When the mark-in/mark-out information is added as indicated in FIG. 10(a), only the segments designated by the information can be reproduced as shown in FIG. 10(b). Illustratively, the original 20-minute content is reduced through editing into a content about 10 minutes long in FIG. 10(b).

The cue point information may be set either in pickup mode or in edit mode. In edit mode, the user viewing the reproduced content selects a representative picture and designates the cue point correspondingly. In turn, the recording/reproduction controller 19 records the frame number denoting the cue point to the data packet.

Apart from the editing of the picture content, it is possible to generate a comment file corresponding to the content in question (in the comment file generating step J5).

Specifically, the user manipulates the operation unit 27 to input a suitable comment in text. The system controller 11 and recording/reproduction controller 19 then turn the input text information into a comment file and records the file to the HDD 18 in association with the content in question.

Although the comment file is described here as a file separate from the content, this is not limitative of the invention. Alternatively, the text information as a comment may be written to data packets.

As another alternative, apart from the text input as a comment, other additional data may be formed into a file associated with the content of interest.

The user as the customer A can upload to the ISP 2 two kinds of content: the content held on the HDD 18 as acquired, or a subsequently edited content.

By manipulating the operation unit 27, the user designates the content, establishes connection with the ISP 2, and performs an upload operation. Specifically, the content held on the HDD 18 (along with any comment file corresponding to that content) is encoded in a stream encoding step J6. The encoded content is transmitted from the communication unit 21 (in step J7).

Before the content is actually uploaded in steps J6 and J7, certain processes need to be carried out between the video camera 1 and the ISP 2 so as to establish the connection therebetween. On the part of the video camera 1, the previously allotted access account is used to establish communication with the ISP 2.

Figure 11:
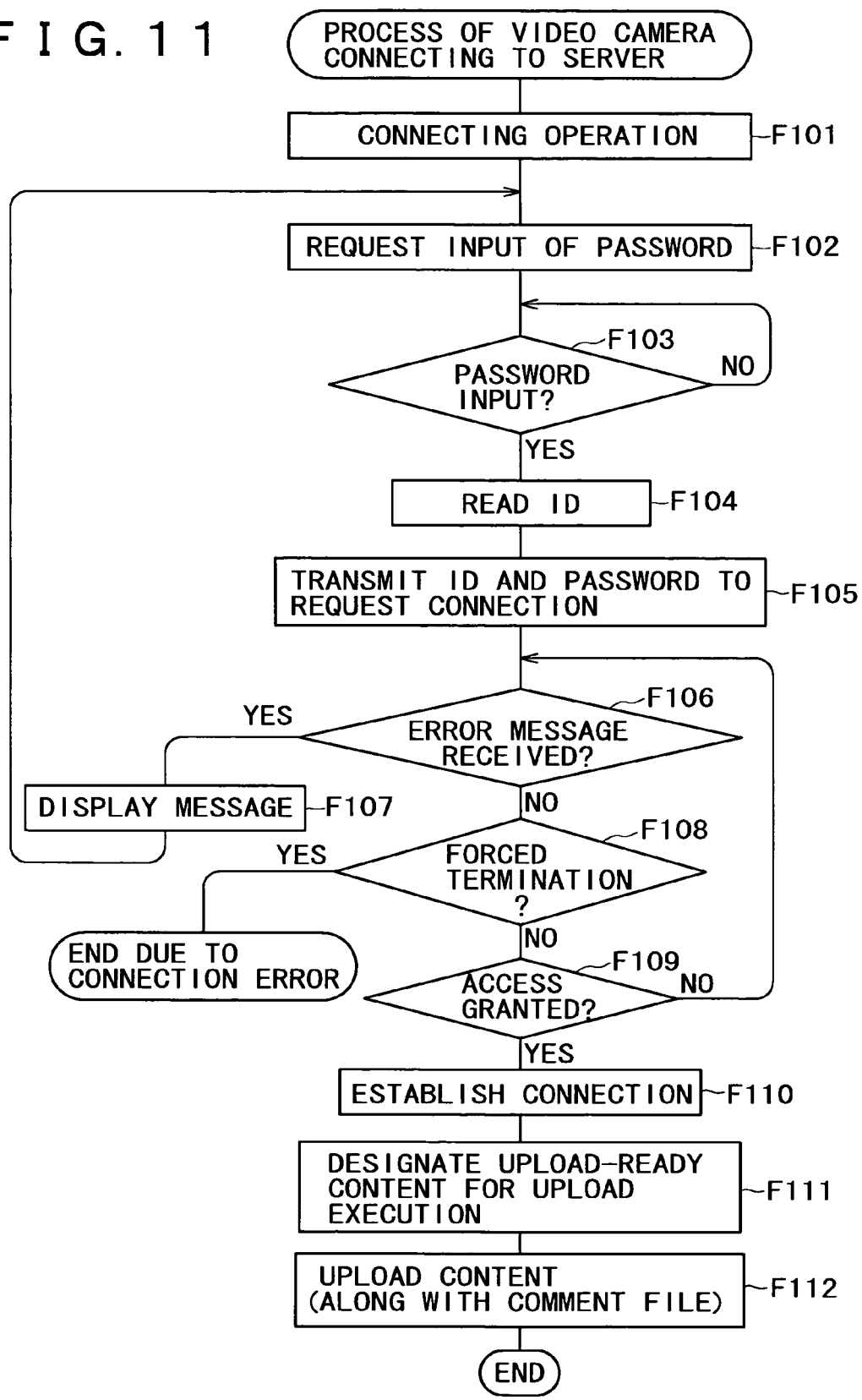
FIG. 11 is a flowchart of steps in which a video camera connects to a server according to the invention.

FIG. 11 shows the process for establishing communication performed by the system controller 11.

In step F101, the system controller 11 detects operations made by the user on the operation unit 27 in order to connect the video camera 1 to the Internet for access to the ISP 2. Upon detection of the user's operations, the system controller 11 goes to step F102 and requests the user to enter a password, illustratively by displaying a password prompt message on the LCD 29. This password is one which is assigned to the video camera 1 in advance as part of the access account along with the ID.

When the user's entry of the password is detected in step F103, step F104 is reached.

It is not necessary to prompt the user to input the password every time connection is to be established. For example, if the user has taken steps to retain the input password, the password may be stored in the flash memory 24 or in other suitable location. This allows the stored password to be later retrieved as needed, and there is no further need for the user to make the password entry.

The system controller 11 then reads the ID from the flash memory 24. This ID is part of the access account (called the camera ID hereunder) assigned to the video camera 1.

In step F105, the system controller 11 causes the communication unit 21 to perform a communication operation. Specifically, the system controller 11 sends a connection request to the ISP 2 through the communication unit 21 using the camera ID and the password.

As will be discussed later with reference to FIG. 12, the ISP 2 in servicing the connection request verifies the transmitted ID and password. In case of a mismatch, the ISP 2 returns the error message and/or forcibly terminates its processing.

If an error message is returned in response to the connection request made in step F105, the system controller 11 goes from step F106 to step F107 and displays the error message text on the LCD 29 together with a prompt message suggesting steps for the user to take. The system controller 11 then goes back to step F102. For example, the prompt message indicates the input of an incorrect password and urges the user to reenter the password.

If the ISP 2 forcibly terminates its connection process in response to the connection request sent in step F105, the system controller 11 goes from step F108 to step F111 and ends the processing as a result of a connection error.

When the ISP 2 permits access in response to the connection request transmitted in step F105, the system controller 11 goes from step F109 to step F110, establishes communication with the ISP 2, and reaches an upload executable state.

When in step F111 the system controller 11 detects the user having designated a content and performed upload operations, the system controller 11 goes to step F112 and uploads the designated content. Specifically, the controller 11 retrieves the content from the HDD 18 and performs the stream encoding step J6 and transmitting step J7 on the retrieved content.

At this point, the system controller 11 also transmits any comment file that may exist on the HDD 18 in association with the content in question.

If the content held on the HDD 18 has been edited with mark-in/mark-out information, then the content will later be reproduced as an edited video stream reflecting the mark-in/mark-out information. Such reproduction is carried out in the stream encoding step J6 and transmitting step J7.

Figure 12:
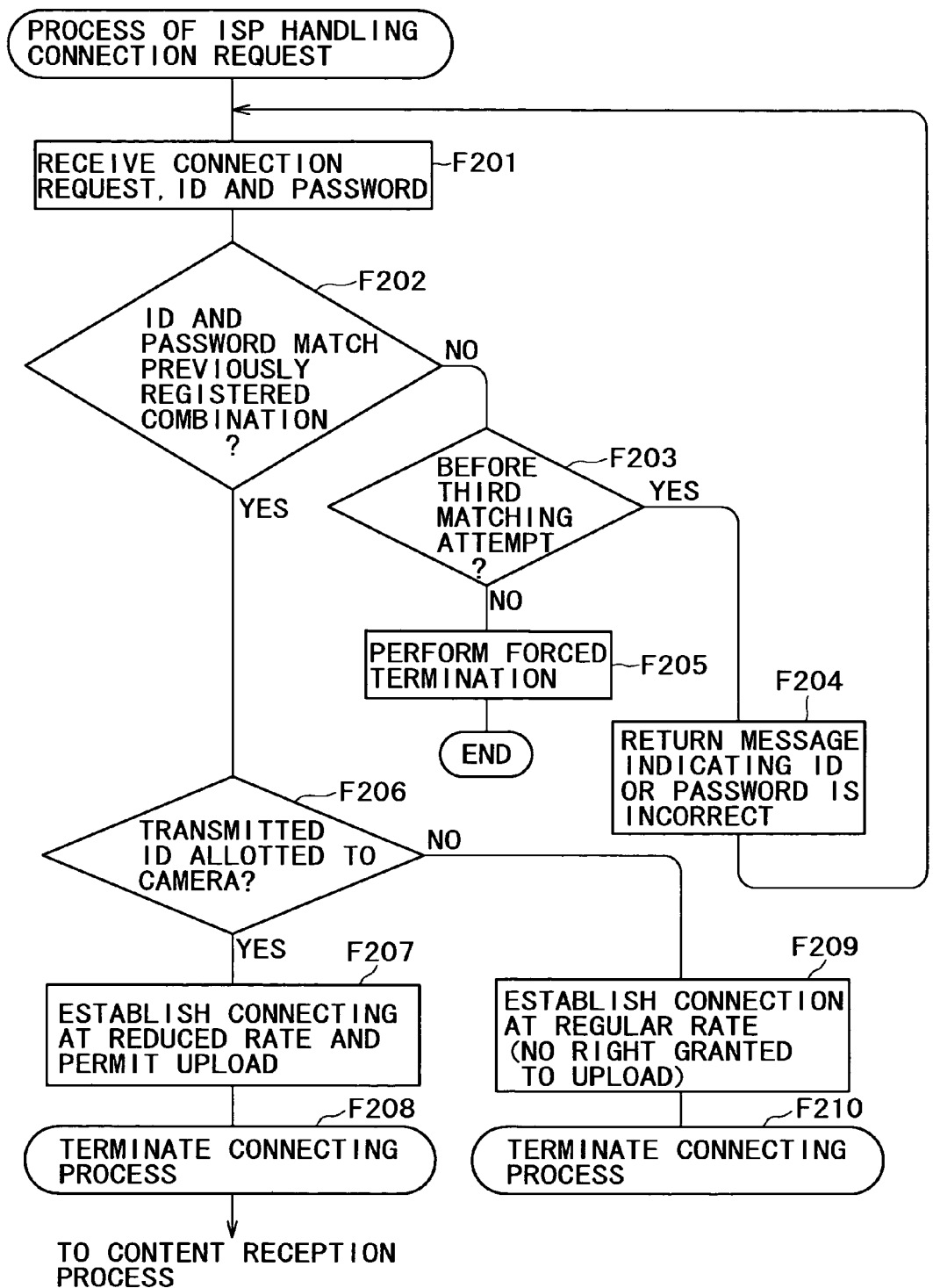
FIG. 12 is a flowchart of steps for requesting a connection to the ISP according to the invention.

FIG. 12 shows the steps performed by the control unit 41 of the ISP 2 when a connection request is received from the video camera 1.

These are detailed steps constituting the connecting step S4 in FIG. 7.

In step F201, the control unit 41 receives a connection request from the video camera 1 together with a camera ID and a password. In step F202, the control unit 41 checks to see if the received camera ID and password are correct. Specifically, a check is made to see if the ID and password match the previously assigned ID-and-password combination as the access account.

In case of a mismatch, step F203 is reached. In step F203, a check is made to see if this matching attempt is prior to a third attempt. If that is the case, then step F204 is reached in which a message is sent to the video camera 1 saying that the ID or password is not correct.

On the side of the video camera 1, steps F106 and F107 in FIG. 11 are carried out. That is, the user again inputs the password, and the ID and the reentered password are transmitted. In response, the control unit 41 again performs the matching in step F202.

If no match is obtained at a third or subsequent matching attempt in step F203, then step F205 is reached and the processing is forcibly terminated. In this case, the video camera 1 ends its operation in error in step F108 of FIG. 11.

If a match is confirmed in step F202, the control unit 41 goes to step F206. In step F206, the control unit 41 checks to see if the ID transmitted as part of the access account is one assigned in advance to the video camera 1.

Whereas this embodiment of the invention presupposes that each video camera 1 is assigned an access account beforehand and that the user who bought the video camera 1 automatically obtains the access account with the ISP 2, there obviously exist other users who have acquired their access accounts from the ISP 2 through a regular sign-up procedure. These are the cases where the users, not the video cameras or like equipment, are in possession of the access accounts.

The check in step F206 is a process for determining whether the connection request is received from a regular user or from the user of the video camera 1. When checked, the ID reveals itself to have been assigned either to a video camera or to a user, since all IDs are obviously managed by the ISP 2.

If the ID indicates that the connection request comes from a regular user, step F209 is reached. The connection is then established at a regular rate in step F209, and this connection process is terminated in step F210.

In this case, the uploading of a content as discussed in conjunction with this inventive system is not carried out. Subsequent steps are performed according to the contract with the user; an upload could be made if so permitted under the contract.

If the ID indicates that the connection request is from the video camera 1 furnished with an access account in advance, then the control unit 41 goes to step F207. In this case, the connection is established at a reduced rate (or free of charge), an upload is permitted, and the connection process is terminated (in step F208).

Thereafter, the video camera 1 carries out step F110 and subsequent steps in FIG. 11 to upload the content.

With the content thus uploaded, the ISP 2 starts a content reception process.

This is a process that corresponds to steps S4 through S8 in FIG. 7, that is, the steps constituting the process ranging from the receipt of the content to the disclosure of the received content at the website.

Figure 13:
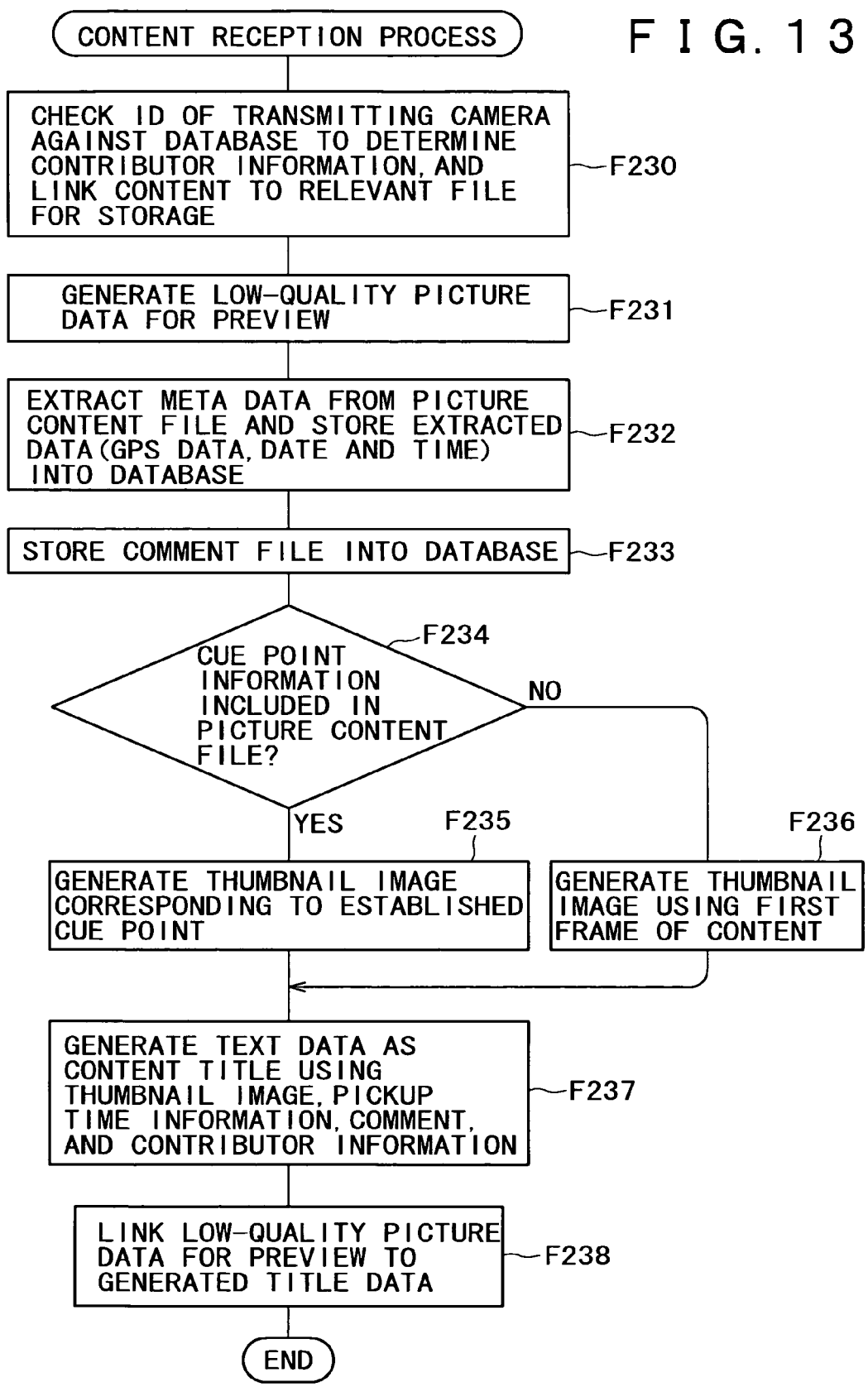
FIG. 13 is a flowchart of steps in which the ISP of the first embodiment receives a content.

FIG. 13 describes the above-mentioned processing.

Upon receipt of the content from the video camera 1, the control unit 41 of the ISP 2 goes to step F230 in FIG. 13. In step F230, the control unit 41 of the IPS 2 checks the camera ID of the transmitting video camera 1 (i.e., ID as part of the access account) against the customer registration database to determine the applicable contributor information. That is, the customer A is identified. The received content is linked to a database file identified in the customer registration database before being stored into the database unit 44.

In step F231, preview data are generated. More specifically, the control unit 41 generates the preview data by causing the data processing unit 43 to take partial (or the entire) picture data from the content data that were received and stored and to subject the data thus taken to a low-quality or small-size picture data generation process. The preview data thus generated are linked to the original content data before being stored into the database unit 44.

In step F232, the control unit 41 extracts meta data that were attached to the content data as data packets, and links the extracted data such as current time and position information to the content data as content attachment data that are then stored into the database unit 44.

In step F233, the text information constituting the comment file sent from the video camera 1 is also stored as content attachment data into the database unit 44.

In steps F234 through F238, the control unit 41 generates title data.

In step F234, the control unit 41 checks to see if the received content includes cue point information.

If the cue point information is determined included, step F235 is reached. In step F235, the control unit 41 extracts the frame corresponding to the cue point information and causes the data processing unit 43 to generate a thumbnail image using the extracted frame.

If no cue point information is determined included in the content, step F236 is reached. In step F236, the control unit 41 extracts the first frame of the content and causes the data processing unit 43 to generate a thumbnail image based on the extracted first frame.

In step F237, the control unit 41 generates text information for reference purposes based on the time information, position information and comment information stored as the content attachment data, as well as on the information held in the linked database file in the customer registration database. The text information thus generated and the thumbnail image created earlier are presented as title data. The title data are linked to the content data before being stored into the database unit 44 or other suitable storage means.

In step F238, the title data are linked to the preview data. This is a process that allows those who browse title data to view the preview data of desired title data when the title data are disclosed at the website of the Web server 2B.

The steps above generate the group of files shown in FIG. 6 with regard to the uploaded content. These files are handed over to the database unit 44 or to other suitable storage means and placed under control of the ISP 2.

These steps complete the processing leading up to step S7 in FIG. 7. The title data are then disclosed by the Web server 2B and potential buyers are solicited.

Figure 14:
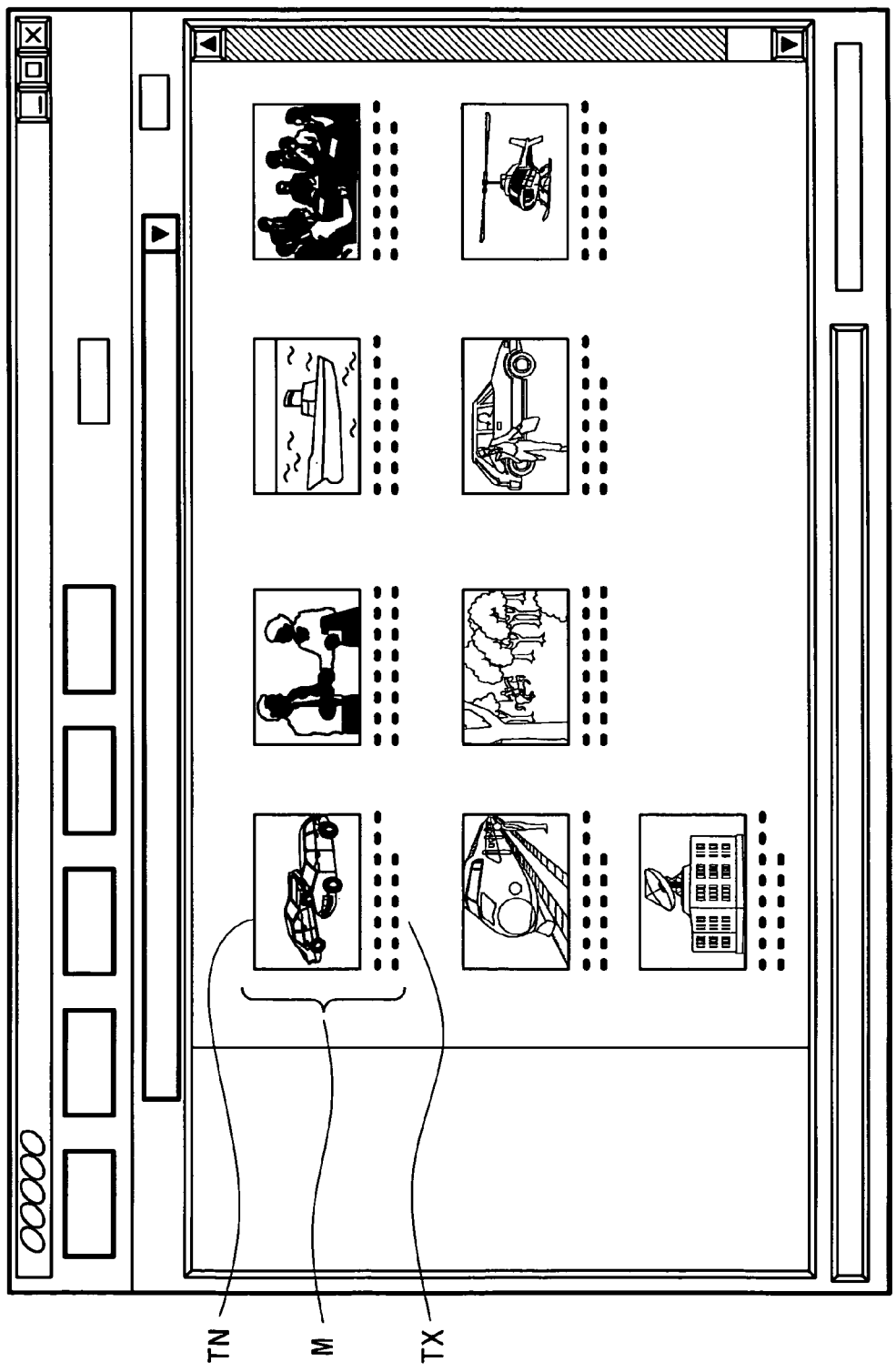
FIG. 14 is an explanatory view depicting how the ISP of the first embodiment presents contents.

Contents are presented by the Web server 2B on a website screen such as one shown in FIG. 14.

On this screen, various contents that can be purchased are presented together with their titles M based on the title data.

Specifically, each content is introduced to potential buyers by use of a thumbnail image TN and text information TX such as introductory remarks.

The customer B such as a TV station may access the Web server 2B, browse the screen, and check to see if there is any content that may be of interest to the TV station.

If the customer B wants to know more about a given content, the customer B may illustratively click on the corresponding thumbnail image TN or text information TX displayed as the title. The click causes the linked preview data to be displayed for scrutiny.

If the customer B decides to purchase the content, then steps S13 through S21 in FIG. 7 are carried out as described above, whereby the content in question is sold and delivered to the buyer.

In FIG. 7, the customer B can verify the credibility of the content in steps S10, S11 and S12.

In step S10, the customer B inquires about the content attachment information about the content. In response, the ISP 2 transmits the content attachment information to the customer B in step S11.

The content attachment information is made up of stored details such as those shown in FIG. 15.

As shown in FIG. 15, the content attachment information illustratively contains comment information sent as a comment file, as well as position and time information in effect at the time of the picture pickup. Also included is the content contributor's information retrieved from the linked database file in the customer registration database. The content contributor's information may include the contributor's name and a history of past contributions stored in the database file in question.

The items of information such as those shown in FIG. 15 are transmitted by the ISP 2 to the customer B as the content attachment information. The customer B may check the transmitted information before deciding whether or not to purchase the content.

For example, the contributor's comment shown in FIG. 15 says that the incident occurred in Hokkaido. However, part of the scenes of the content (corresponding to time codes 01:00:02:13 through 01:00:03:04) includes GPS information pointing to a Kyushu location. The corresponding scene has a time stamp different from that of the other scenes. Moreover, the contributor's transaction history indicates two out of the past three contributions were evaluated as NG.

With these pieces of information taken into consideration, the content in question is determined to be low in credibility. The determination may prompt the customer B to refrain from purchasing the content.

Figure 10:
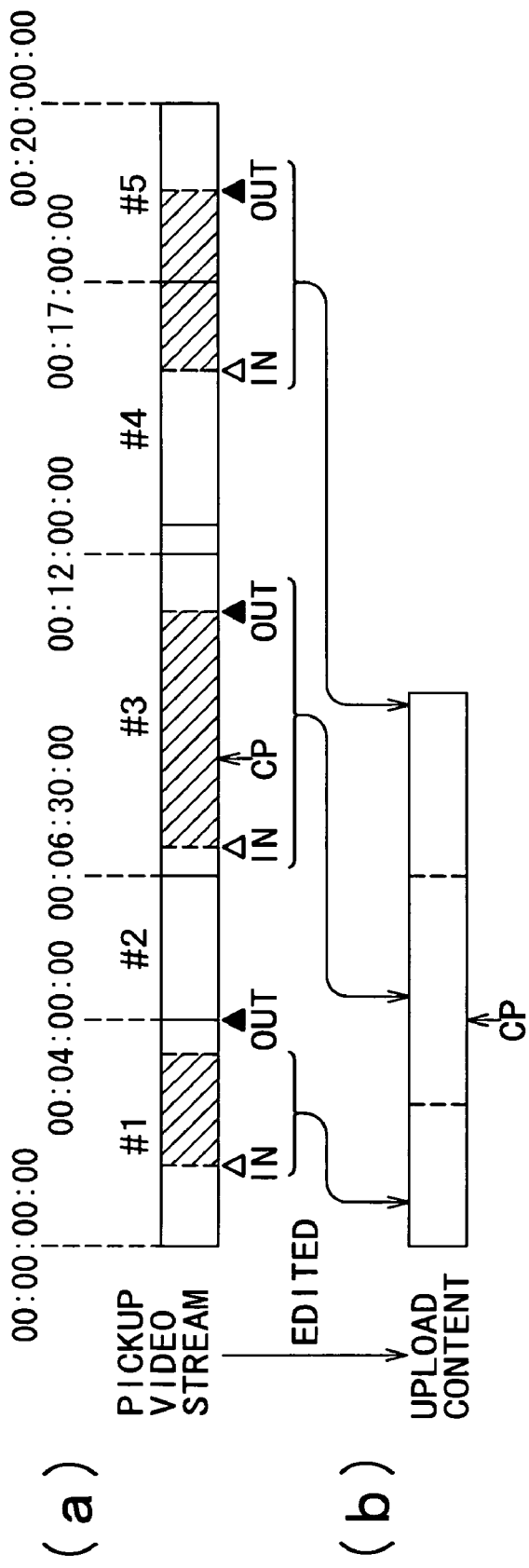
FIG. 10 is an explanatory view indicating how a content is edited according to the invention.

If representing illustratively a TV station, the customer B is obligated to ascertain that the content to be bought is genuine and free of fraudulent compositions or manipulations (except for the simple editing of cuts such as those shown in FIG. 10), since the content will be eventually broadcast to the general public.

Thus it is very useful and convenient for the customer B to be offered the content attachment information prior to purchase of any content and to be able to verify the credibility of the content in question. Offering such information to potential buyers also helps increase the reliability of this system embodying the invention.

The ISP 2, for its part, can make effective use of the meta data and comment files included in contents, as well as other information transmitted from the video camera 1.

How a content is determined for credibility was discussed above with reference to FIG. 15. As has been implied, the determination on content credibility is based on the following factors:

Discontinuity of Position Information within the Same Content

If pictures are taken while the camera is on the move, the GPS information should change on a geographically continuous basis. If pictures are taken while the camera is at a fixed location, the GPS information should remain the same throughout the scenes of the content. Where a single content includes GPS data pointing to a plurality of remote locations, that means the content may have been edited deliberately to fabricate certain pictures of an accident or incident.

Inconsistency of Time Information within the Same Content

A single content made of the pictures of an accident or incident may turn out to have a time stamp different from that of the actual accident or may include temporally far-fetched pictures. If that is the case, fraudulent editing is suspected.

Mismatch Between Comment and Position Information

It might happen that an incident occurred in Hokkaido and that the customer A took pictures of it and uploaded the picture content. In such a case, the customer A is expected to make a comment such as "The *** case in Hokkaido." If the geographical name in a comment fails to match the GPS information in the corresponding content, then the content is suspected to be fraudulent.

Mismatch Between Comment and Time Information

It might happen that the date and time of a comment do not match those of the content. In that case, as with the unmatched GPS information, the content is suspected to be fraudulent.

Determination Based on the Customer A's History Information

In step S20 of FIG. 7, each content buyer transmits evaluation data after the purchase. In step S21, the ISP 2 enters into the customer registration database the evaluation data as the customer A's history information. Other history information about the customer A, such as the number of uploaded content contributions, the nature of the past contributed contents, and information about the support for selling/buying negotiations involving the customer A, is also stored into the customer registration database. These items of information are retained as the customer A's history information (except for the details deemed private) in the customer registration database. Of these items, the evaluation data and the number of contributions are illustratively used as a basis for determining the credibility of each content.

Taking the above factors into account helps the customer B determine the credibility of a given content before deciding whether or not to buy it.

Although the final decision about whether or not to purchase the content is made personally by the customer B upon receiving and scrutinizing the content attachment information, the handling of certain data items could be automated. For example, the continuity of position information and the match or mismatch of time information can be verified in a fairly automatic manner. Illustratively, the ISP 2 may provide the customer B's terminal with credibility determination software for automatically determining the credibility of some of the items of content attachment information transmitted.

Although the determination about content credibility is important with regard to the journalistic pictures covering incidents, events and accidents, that is not necessarily the case with pictures in other fields. For example, pictures for entertainment or documentary purposes may not be regarded as fraudulent when composed or otherwise processed.

Given such specificities, the content attachment information presented by the inventive system for credibility determination should serve merely as a basis on which the customer B makes his or her own subjective determination.

Operating as described above, the system of this embodiment provides benefits to the three parties involved: customer A, ISP 2, and customer B. In so doing, the system promotes distribution of picture contents and thereby offers more convenience to society.

The customer A, using the video camera 1, is able to upload contents without going through tiresome sign-up procedures. Because the video camera 1 itself permits the picture content to be edited, encoded in streaming format, and transmitted to a connected server, there is no need for further hardware such as a personal computer for uploading. It is extremely easy for the customer A to upload a given content immediately after taking pictures for example. The connection of the video camera 1 to the ISP 2 is provided free of charge or at a reduced rate. Needless to say, the ISP 2 takes charge of soliciting a wide range of potential buyers for the presented contents.

These benefits make this embodiment a valuable system for the customer A who is thereby encouraged to upload more contents.

Promoting the uploading of contents as described above, the ISP 2 offers a wider assortment of the presented contents than before and thus provides a socially useful content distribution service. That service, among others, brings a further profit to the ISP 2.

For the customer B, this embodiment is a system for readily obtaining necessary picture contents. The system is particularly useful for the customer B looking out for the journalistic pictures that require prompt handling. With appropriate measures taken for the customer B to determine the credibility of a given content, the customer B can make a wiser, more prudent determination than before on the purchase of the content.

<B> Second Embodiment

A content providing system practiced as the second embodiment of the invention will now be described with reference to FIGS. 16 and 17. The second embodiment is basically the same in structure as the first embodiment, so that only the differences between the two embodiments will be discussed hereunder.

The second embodiment is characterized in that the credibility of contents is determined by the ISP 2.

Figure 16:
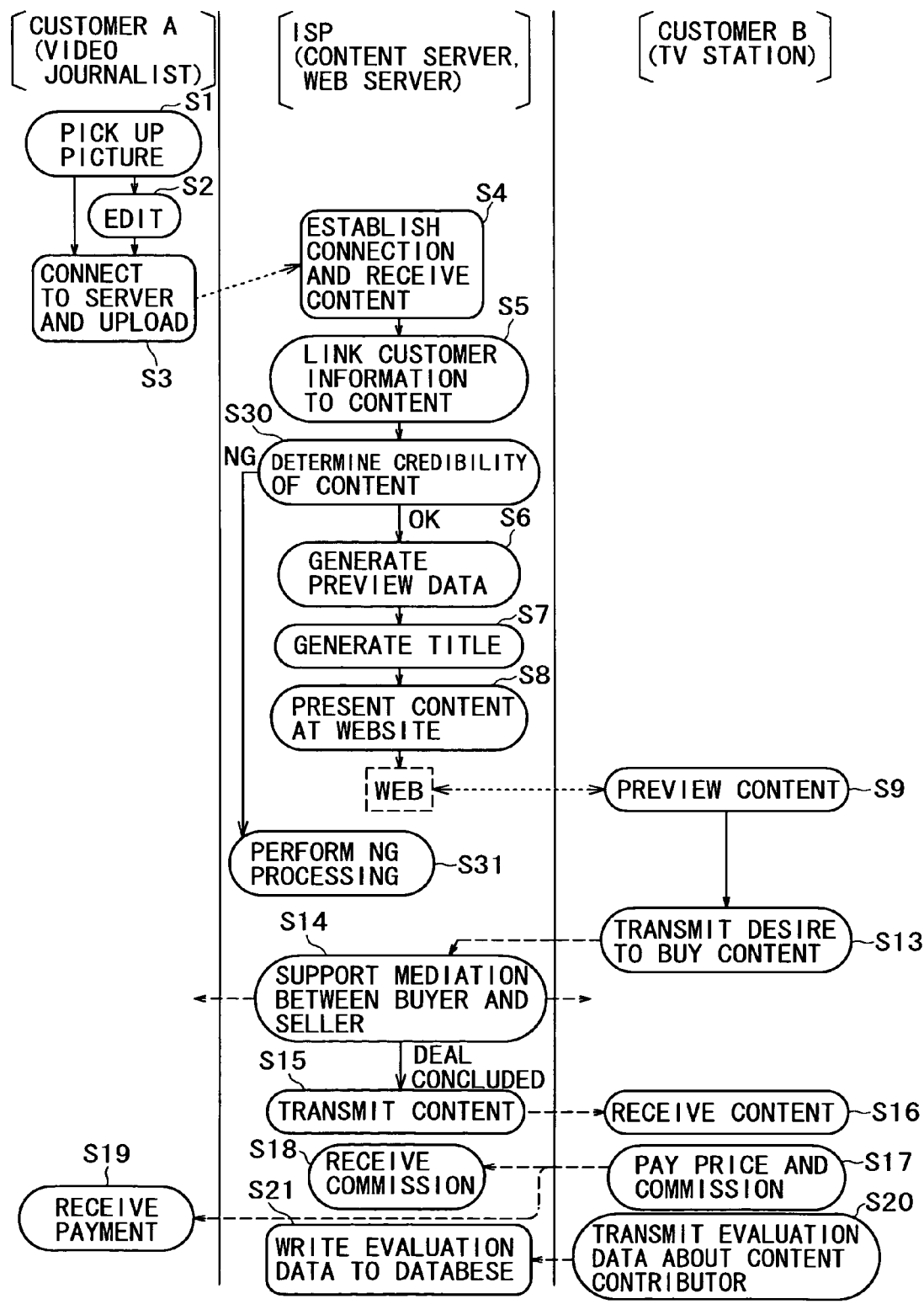
FIG. 16 is an explanatory view of steps performed by a content providing system practiced as a second embodiment of this invention.

FIG. 16 schematically shows the steps performed by the content providing system practiced as the second embodiment of this invention. As opposed to the corresponding steps in FIG. 7, a credibility determining step S30 and an NG processing step S31 in FIG. 16 are carried out by the ISP 2. The credibility determining step of the second embodiment eliminates the need for steps S10, S11 and S12 in FIG. 7 performed by the customer B for credibility determination.

The remaining steps S1 through S9 and S13 through S21 in FIG. 16 are the same as those in FIG. 7 and thus will not be described further.

When the video camera 1 uploads a content, the ISP 2 stores the uploaded content into the database unit 44 in step S4. After the ISP 2 identifies the customer A who uploaded the content by referencing the customer registration database in step S5, the ISP 2 carries out the credibility determining process (S5).

If the content is determined credible, the ISP 2 creates preview data in step S6, generates title data in step S7, and has the Web server 2B present the content at its website in step S8.

Thereafter, when the customer B browsing the website wishes to purchase the content in question, the ISP 2 supports negotiations between the buyer and the seller, allows the content to be delivered, and takes care of the billings involved, all in the same manner as with the first embodiment.

If the content is determined not very credible, the ISP 2 goes to step S31 for NG processing. The details of NG processing may be diverse, as will be discussed later.

Figure 17:
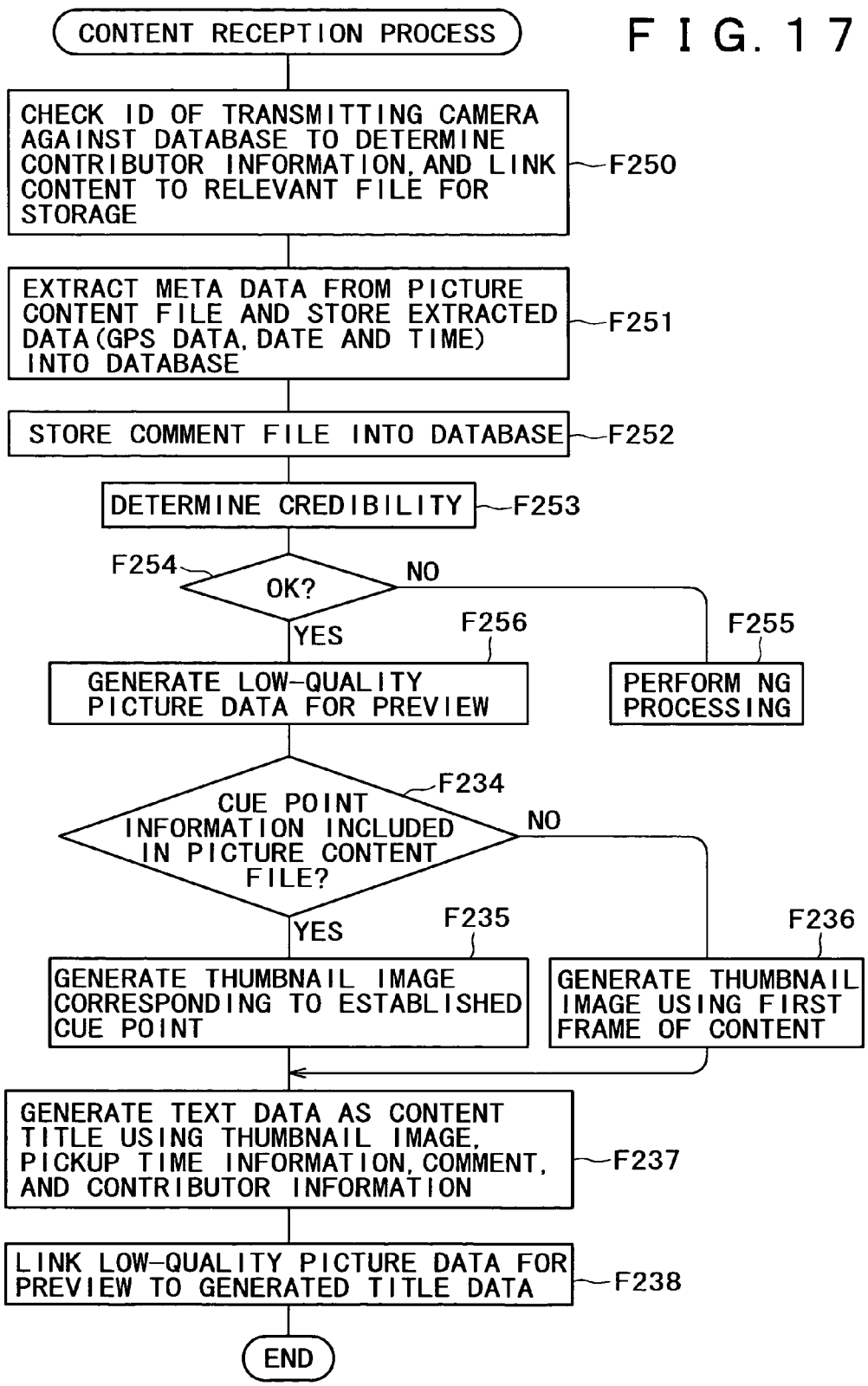
FIG. 17 is a flowchart of steps in which the ISP of the second embodiment receives a content.

FIG. 17 shows a detailed process performed by the ISP 2 in steps S4, S5, S30, S6, S7, S8 and S31.

Upon receipt of a content from the video camera 1, the control unit 41 of the ISP 2 reaches step F250 in FIG. 16 and checks the camera ID of the video camera 1 (i.e., ID as part of the access account) against the customer registration database in order to determine the information about the content contributor (i.e., customer A). The received content is linked to a database file identified in the customer registration database before being stores into the database unit 44.

In step F251, the control unit 41 extracts meta data that were added to the content data as data packets, and stores the extracted data such as time and position information to the database unit 44 as content attachment data linked to the content data in question.

In step S252, the control unit 41 stores into the database unit 44 text information constituting a comment file sent from the video camera 1. The text information forms an additional part of the same content attachment data.

With such added data items extracted, the control unit 41 goes to step F253 for a credibility determining process.

As discussed above in conjunction with the first embodiment, the credibility of a given content is determined on the basis of the continuity of position information, the consistency of time information, the coincidence of comment details with position and time information, and the customer A's history information.

The actual processing is carried out either automatically by the control unit 41, or in semi-automated fashion by the control unit 1 in collaboration with an operator at the ISP 2.

In the semi-automated processing, the control unit 41 illustratively presents the operator with information such as that shown in FIG. 15 based on the above-described additional information extracted. For example, the ISP 2 displays or prints the information on a display unit or on a printer (not shown in FIG. 4). If the operator's terminal is remotely located, the information may be transmitted to that terminal for output.

Given the information, the operator determines the credibility of the content in a comprehensive manner and inputs an order "OK" or "NG" into the control unit 41. The control unit 41 process that input as the result of the determination.

The result of the operator's determination need not be binary (either OK or NG). The determination on credibility may be rated at one of three or more levels or in percentage points. The determination may alternatively be input in the form of a comment in text about the doubts or questions regarding the content in question.

The automated processing may be carried out by the control unit 41 operating on, for example, numerically interpretable factors. For example, the control unit 41 may perform steps to determine the continuity of position information and the consistency of time information before passing the determination of OK or NG on content credibility. In this case, too, the determination may be rated at one of three or more levels or in percentage points. Depending on the result of its operations, the control unit 41 may alternatively pick up the data elements deemed inappropriate and thereby offer information suggesting illustratively the absence of positional continuity.

How to obtain the result of credibility determination may be determined depending on the type of NG processing, to be described later.

If in step F253 the credibility of the content is determined to be NG, step F255 is reached via step F254. In step S255, NG processing (i.e., step S31 in FIG. 16) is carried out.

If in step F253 the credibility of the content is determined to be OK, step F256 is reached via step F254. In step F256, preview data are generated. Specifically, the control unit 41 takes partial (or the entire) picture data from the content data that were received and stored and subjects the data thus taken to a low-quality or small-size picture data generation process by the data processing unit 43. The preview data thus generated are linked to the original content data before being stored into the database unit 44.

The control unit 41 goes on to steps F234 through F238 to generate title data.

These steps, functionally identical to their counterparts in FIG. 17, are designated by like reference numerals and thus will not be described further.

With the processing finished up to step F238, the uploaded content is furnished with the group of files shown in FIG. 6 before being handed over to the database unit 44 or to other suitable storage device and placed under management of the ISP 2. This completes the processing of up to step S7 in FIG. 16. The title data thus generated are disclosed by the Web server 2B at its website and potential buyers are solicited.

With regard to the NG processing step F255 representing step S31 in FIG. 16, there can be two methods by which to execute the step depending on whether the content determined not credible is submitted to the Web server 2B for disclosure.

On the one hand, the content determined NG may simply be barred from disclosure by the Web server 2B.

In this case, the NG processing step at step F253 is reached only if there is a high possibility that the content is not credible.

The content barred from disclosure is deleted from the database unit 44, and/or the customer A who uploaded the content in question is notified of the decision not to disclose the content.

As another alternative, the NG determination is stored as part of the customer A's history in the customer registration database. When the number of NG determination exceeds a predetermined level, the customer A may be given a warning.

On the other hand, the content deemed NG may still be disclosed by the Web server 2B at its website.

In this case, step F256 and subsequent steps are carried out to generate preview data and title data for disclosure by the Web server 2B. Illustratively, the title data are arranged to contain information about the result of the credibility determination so that the final decision to buy or not to buy the content is up to the customer B.

Specifically, the binary determination (either OK or NG), the credibility rated at one of three or more levels or in percentage points, or other evaluations may be disclosed as part of the title data at the website.

In determining whether or not to purchase a given content, the customer B can check the accompanying credibility evaluation information while reading the comment about the content.

If the content is submitted to the Web server 2B for disclosure according to the second method above, steps S10 through S12 in FIG. 7 discussed in connection with the first embodiment may be carried out. That is, the ISP 2 may transmit, on the customer B's request, relevant information that allows the customer B to make determination on the credibility of a given content.

As described, the second embodiment improves the reliability of the system by enabling the ISP 2 to determine the credibility of contents. The second embodiment also helps prevent the customer B from inadvertently purchasing fraudulent contents.

As discussed in connection with the first embodiment, it is not necessary for certain categories of contents to be determined for credibility. It is thus preferred that the processing of credibility determination be limited illustratively to the contents handled by the Web servers 2B dealing solely in the distribution of journalistic contents.

<C> Third Embodiment

A content providing system practiced as the third embodiment of the invention will now be described with reference to FIG. 18.

In the third embodiment, the ISP 2 functions as a so-called IR information website. Corporations illustratively disclose through the ISP 2 investor-oriented information that could directly affect the firms' stock prices, such as announcements of new products to the media or CEOs' speeches. Described below is an example in which an announcement is made by a corporation to the media. In this example, the customer A using the video camera 1 is the corporation's person in charge of IR, and the customer B represents the investors at large.

In step S50 of FIG. 18, the corporation's person in charge of IR sets up the video camera 1 illustratively in a conference room where the announcement is to be made to the reporters. The video camera 1 is connected beforehand to the ISP 2 as the IR information website by use of the Internet connection account assigned to the camera system. The steps in which the video camera 1 and the ISP 2 establish their connection are substantially the same as those discussed above in conjunction with the first embodiment. That is, the video camera 1 may follow steps F101 through F110 in FIG. 11 while the ISP 2 may execute the steps of FIG. 12 representative of a connecting step S51 in FIG. 18.

After establishing the connection with the video camera 1, the ISP 2 reaches step S52 in which the customer registration database is searched through to identify the customer A using the camera ID as the access account.

With the corporation's announcement launched, the customer A reaches step S53 and starts transmitting to the ISP 2 pictures taken by the video camera 1 as a live picture content.

In step S54, the ISP starts receiving the picture content, extracts added information as meta data from the transmitted content, and references the customer registration database in order to generate title data about the content including the corporation's name and the time stamp.

In step S55, the ISP 2 submits the title data thus generated to the Web server 2B for disclosure at its website.

The customer B representing the inventors browses the titles updated at the website run by the Web server 2B (in step S57) and, if a promising content is found, performs a viewing request operation such as a click on the applicable title data presented by the Web server 2B (in step S58).

In response, the ISP 2 reaches step S59 and relays to the customer B the live pictures being transmitted continuously from the video camera 1.

The customer B gets the live picture content displayed at the terminal equipment, whereby the announcement on the side of the customer A can be viewed (S60).

At the end of the announcement, the customer A causes the video camera 1 to stop transmitting the pictures (in step S56).

In turn, the ISP 2 stops receiving the live picture transmission (in step S61).

Thereafter, the ISP 2 places the live picture content from the video camera 1 into the database unit 44 as a single picture file (in step S62).

From the time that the video camera 1 starts sending the pictures in step S53 until the transmission ends in step S56, the ISP 2 records the transmitted pictures. The recorded pictures are turned into a single picture file that is stored into the database unit 44 in linked relation to the title data and to the database file associated with the customer A in the customer registration database.

The customer B can view the live pictures in step S60 but the pictures are often viewed halfway into the transmission because the customer B does not check the Web server 2B all the time. Needless to say, the customer B could sometimes miss the transmission of interest altogether.

With such eventualities taken into account, the ISP 2 keeps presenting the title data about the picture file content at the website of the Web server 2B.

This allows the customer B, if so desired, to view the picture content derived from the picture file after the live transmission of the pictures has ended. Illustratively, if the customer B wishes to view the pictures from the video camera 1 from the start (or to view the pictures all over again), the customer B may perform a suitable operation such as a click on the applicable title data at the website of the Web server 2B so as to request (in step S63) the picture file (i.e., the recorded content).

In response, the ISP 2 transmits the requested picture file to the customer B (in step S64). The transmission allows the customer B to view the pictures of the requested file at his or her terminal equipment (in step S65).

The picture file may be transmitted from the ISP 2 as a real-time stream of picture data to the customer B's terminal for viewing by the customer B (in a picture broadcast scheme). Alternatively, the picture file itself may be downloaded to the customer B's terminal and written to a hard disc drive (HDD) or other suitable location so that the pictures may later be viewed whenever desired (in a picture delivery scheme).

The customer B having viewed the picture content through the use of this system pays a viewing fee (in step S66). The ISP receives the payment (in step S67)

The viewing fee may be charged per content or per month (at a flat rate) depending on the contract.

The ISP 2 may also pay a content upload fee to the customer A.

In the manner described, the system of this invention helps promote the distribution of picture contents in society. As such, the inventive system may also function as a simplified broadcasting system.

With the emphasis on the broadcasting function, it is not mandatory for the video camera 1 of the system to possess the storing ability such as the HDD 18 to accommodate picked-up picture contents.

<D> Other Variations

While some preferred embodiments of this invention have been described above using specific terms, such description is for illustrative purposes only. Other alternatives, modifications and variations may be conceived and implemented without departing from the spirit or scope of this invention.

For example, the video camera 1 was described as the customer A's content transmission apparatus whereby picture contents (actually made up of pictures and sounds) are transmitted. Alternatively, the apparatus may transmit contents of sounds only in a content distribution system according to the invention.

Specifically, the content transmission apparatus may be an audio data recording/editing apparatus that allows the customer A to create and upload a music content. With such music contents uploaded to and disclosed at its website, the ISP 2 may solicit potential buyers for the contents.

In a scheme similar to the third embodiment described above, the content transmission apparatus may be set up in a concert hall or in a conference room to let the customer B listen to a live audio content being picked up at the site.

In the typical system configuration described above, the storage unit of the video camera 1 and the database unit 44 of the ISP 2 were each shown composed of a hard disc drive. However, this is not limitative of the invention. Alternatively, the storage unit and database unit may each be constituted by any one of diverse media: disc recording media such as DVD (Digital Versatile Disc) or CD (Compact Disc); magnetic tape media; or solid-state memory media such as a flash memory.

Furthermore, there may also exist many variations, alternatives and modifications without departing from the spirit or scope of this invention as to the structure, communication establishing process, and uploading process of the video camera 1; the way the content server 2A and Web server 2B are run at the ISP 2; and processing steps carried out by the ISP 2.

INDUSTRIAL APPLICABILITY

As described, the content transmission apparatus according to this invention is implemented illustratively as a video camera furnished beforehand with an access account for connection to a server apparatus. The user, when taking possession of the video camera or like content transmission apparatus of the invention, automatically enters into contract with the server apparatus that is typically an ISP. The content transmission apparatus is equipped with an ability to encode contents in a streaming format for upload purposes and an ability to connect with the server, the abilities being implemented either integrally or independently (e.g., in an adapter). Given these features, the content transmission apparatus alone can upload contents to the server in an environment where personal computers or communication devices are unavailable. The server apparatus, for its part, may present the uploaded contents illustratively at a website using suitable presenting means, whereby potential buyers of the contents are solicited extensively.

The inventive system is thus constructed so that the contents generated by the video camera or like equipment may be readily uploaded to the server apparatus and that the server may extensively solicit potential buyers for the uploaded contents. The system thus contributes appreciably to promoting the distribution of contents in society.

The invention claimed is:

1. A video camera comprising:
content generating means for generating a content for sale to content users for payment thereof;
communicating means for communicating with a server apparatus, which solicits and mediates the sales of contents to the content users, via a communication network;
storing means for storing an access account data, provided beforehand by a manufacturer of the video camera, for access to said server apparatus;

comment information generating means for generating comment information corresponding to said content;

stream encoding means for stream encoding, in a communicable streaming format, the content generated by said content generating means along with the comment information; and controlling means for performing a connection control operation to connect said communicating means to said server apparatus using said access account data stored in said storing means, said controlling means further performing a transmission control operation causing said stream encoding means to stream encode said content along with said comment information to transmit the stream encoded content along with comment information to said server apparatus.

2. The video camera according to claim 1, wherein at least one of said stream encoding means and said communicating means is incorporated in an enclosure independent of but connectable to a main body of the video camera incorporating said content generating means.

3. The video camera according to claim 1, wherein said content generating means includes a picture pickup unit for picking up data constituting a picture content.

4. The video camera according to claim 1, further comprising recording and reproducing means for recording to a storage medium said content generated by said content generating means and reproducing the recorded content from said storage medium;

wherein said controlling means performs said transmission control operation on the content reproduced from said storage medium by said recording and reproducing means.

5. The video camera according to claim 4, further comprising editing means for editing the content generated by said content generating means and recorded to said storage medium by said recording and reproducing means;

wherein said controlling means performs said transmission control operation on the content edited by said editing means.

6. The video camera according to claim 1, further comprising designation information supplementing means for generating designation information by which to designate representative data from within data constituting said content and supplementing said content with the generated designation information;

wherein said controlling means performs said transmission control operation on said content supplemented with said designation information.

7. The video camera according to claim 1, further comprising time information supplementing means for generating information about a time at which said content was generated and supplementing said content with the generated time information;

wherein said controlling means performs said transmission control operation on said content supplemented with said time information.

8. The video camera according to claim 1, further comprising position information supplementing means for generating information about a position at which said content was generated and supplementing said content with the generated position information;

wherein said controlling means performs said transmission control operation on said content supplemented with said position information.

9. A content transmitting method for use with a video camera which retains access account data provided beforehand by a manufacturer of the video camera for access to a server apparatus which solicits and mediates sales of contents to content users, said content transmitting method comprising the steps of:

causing said video camera to generate a content for sale to the content users for payment thereof;

causing said video camera to connect communicably with said server apparatus, which solicits and mediates sale of the content, using said access account data;

generating comment information corresponding to said content;

stream encoding, in a communicable streaming format, said content generated in said content generating step along with the comment information; and transmitting the stream encoded content along with comment information to said server apparatus connected communicably with said content transmission apparatus.

10. A content transmitting method according to claim 9, wherein the content generating step generates a picture content made up of picked-up picture data.

11. A content transmitting method according to claim 9, further comprising the step of recording to a storage medium said content generated in the content generating step;

wherein the transmitting step comprises reproducing the recorded content from said storage medium before the transmission.

12. A content transmitting method according to claim 11, further comprising the step of editing said content recorded to said storage medium in the recording step;

wherein the transmitting step comprises reproducing and transmitting said content edited in the editing step.

13. A content transmitting method according to claim 9, further comprising the steps of generating designation information by which to designate representative data from within data constituting said content and supplementing said content with said designation information thus generated;

wherein the transmitting step transmits said content supplemented with said designation information.

14. A content transmitting method according to claim 9, further comprising the steps of generating information about a time at which said content was generated and supplementing said content with the time information thus generated;

wherein the transmitting step transmits said content supplemented with said time information.

15. A content transmitting method according to claim 9, further comprising the steps of generating information about a position at which said content was generated and supplementing said content with the position information thus generated;

wherein the transmitting step transmits said content supplemented with said position information.

16. A content providing system comprising a video camera and a server apparatus which solicits and mediates sales of contents to content users, wherein said video camera includes:

content generating means for generating a content for sale to the content users for payment thereof;

communicating means for communicating with said server apparatus via a communication network for solicitation and mediation of the sale of the content;

storing means for storing an access account data, provided beforehand by a manufacturer of the video camera, for access to said server apparatus;

comment information generating means for generating comment information corresponding to said content;

stream encoding means for stream encoding, in a communicable streaming format, the content generated by said content generating means along with the comment information; and controlling means for performing a connection control operation to connect said communicating means to said server apparatus using said access account data stored in said storing means, said controlling means further performing a transmission control operation causing said stream encoding means to stream encode said content along with said comment information to transmit the stream encoded content along with comment information to said server apparatus; and wherein said server apparatus includes:

communicating means for conducting communications over said communication network;

a contributor information database for storing contributor information about video cameras each provided beforehand by manufacturers of the video cameras with an access account;

determining means which, if a connection request is made to said communicating means, references said contributor information database to determine whether said connection request is coming from any one of said video cameras each provided beforehand with said access account;

a storage unit;

content storage controlling means which, following the determination by said determining means, stores into said storage unit the content and comment information transmitted from the video camera connected communicably with said communicating means;

presenting means for presenting, as a solicitation of an available content for sale, said content transmitted from said video camera through said communicating means; and transmission controlling means which, in response to a transmission request by an entity for said content presented by said presenting means, transmits said content to the requesting entity through said communicating means upon payment therefor.

* * * * *